(12) United States Patent
Xia et al.

(10) Patent No.: US 12,471,788 B2
(45) Date of Patent: Nov. 18, 2025

(54) ELECTRONIC DEVICE FOR MEASURING BLOOD PRESSURE

(71) Applicant: Huawei Technologies Co., Ltd., Shenzhen (CN)

(72) Inventors: Lan Xia, Shenzhen (CN); Huangwei Wu, Shenzhen (CN); Zhenlong Huang, Shenzhen (CN); Xiaoyu Fu, Shenzhen (CN); Linfeng Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 832 days.

(21) Appl. No.: 17/784,535

(22) PCT Filed: Dec. 2, 2020

(86) PCT No.: PCT/CN2020/133294
§ 371 (c)(1),
(2) Date: Jun. 10, 2022

(87) PCT Pub. No.: WO2021/115173
PCT Pub. Date: Jun. 17, 2021

(65) Prior Publication Data
US 2023/0019122 A1  Jan. 19, 2023

(30) Foreign Application Priority Data
Dec. 12, 2019 (CN) .......................... 201911274421.2

(51) Int. Cl.
*A61B 5/021* (2006.01)
*A61B 5/00* (2006.01)
*A61B 5/022* (2006.01)

(52) U.S. Cl.
CPC ...... *A61B 5/02141* (2013.01); *A61B 5/02233* (2013.01); *A61B 5/681* (2013.01)

(58) Field of Classification Search
CPC . A61B 5/02141; A61B 5/02233; A61B 5/681; A61B 5/02225; A61B 5/0225
See application file for complete search history.

(56) References Cited

U.S. PATENT DOCUMENTS 6,251,080 B1   6/2001  Henkin et al.
2015/0025400 A1  1/2015  Nishioka et al.
(Continued)

FOREIGN PATENT DOCUMENTS

CN   104168822 B   8/2016
CN   207679435 U   8/2018
(Continued)

*Primary Examiner* — Etsub D Berhanu
*Assistant Examiner* — Lucy Eppert
(74) *Attorney, Agent, or Firm* — Leydig, Voit & Mayer, Ltd.

(57) ABSTRACT

An electronic device for measuring blood pressure includes a measurement assembly, an airbag, and a fluid pipeline, where a fluid pump and a pressure sensor in the measurement assembly are connected to the airbag through a first fluid pipeline and a second fluid pipeline respectively, a first nozzle in the first fluid pipeline and a second nozzle in the second fluid pipeline are located on a same side of the airbag, and an opening direction of one of the first nozzle and the second nozzle is away from that of the other, so that the first nozzle and the second nozzle are away from each other. This reduces impact on the pressure sensor caused by airflow in the airbag, and improves blood pressure measurement accuracy.

19 Claims, 16 Drawing Sheets

(56) References Cited

U.S. PATENT DOCUMENTS

| | | |
|---|---|---|
| 2015/0335282 A1 | 11/2015 | Lee |
| 2016/0287104 A1* | 10/2016 | Tsunoda ............. A61B 5/02233 |
| 2017/0049342 A1 | 2/2017 | Chen et al. |
| 2018/0140209 A1* | 5/2018 | Ono ................... A61B 5/02233 |
| 2019/0021612 A1 | 1/2019 | Lin et al. |
| 2019/0090761 A1* | 3/2019 | Sawanoi ................ A61B 5/022 |

FOREIGN PATENT DOCUMENTS

| | | | |
|---|---|---|---|
| CN | 109998509 | A | 7/2019 |
| CN | 211934039 | U | 11/2020 |
| JP | H06114015 | A | 4/1994 |
| JP | 2004254717 | A | 9/2004 |
| JP | 2006081667 | A | 3/2006 |
| JP | 2019122534 | A | 7/2019 |
| KR | 20170019950 | A | 2/2017 |
| WO | 2013169014 | A1 | 11/2013 |
| WO | 2018099389 | A1 | 6/2018 |

\* cited by examiner

ELECTRONIC DEVICE FOR MEASURING BLOOD PRESSURE

CROSS-REFERENCE TO RELATED APPLICATIONS

This application is a National Stage of International Application No. PCT/CN2020/133294, filed on Dec. 2, 2020, which claims priority to Chinese Patent Application No. 201911274421.2, filed on Dec. 12, 2019, both of which are hereby incorporated by reference in their entireties.

TECHNICAL FIELD

This application relates to the field of electronic devices, and in particular, to an electronic device for measuring blood pressure.

BACKGROUND

As modern people pay increasing attention to health, an increasing quantity of wearable devices or other electronic devices are integrated with a blood pressure measurement function, to monitor physiological indexes such as blood pressure of a human body anytime and anywhere.

Currently, a device with a blood pressure measurement function usually performs measurement through oscillometry. Specifically, in oscillometry, an artery of a testee is compressed by an airbag, and blood pressure in the artery of the testee impacts the airbag, so that air pressure in the airbag fluctuates. After a fluctuation status of the air pressure in the airbag is obtained, indexes such as blood pressure of the testee can be calculated. For example, a conventional terminal device specifically includes components such as an airbag, a fluid pump used for inflation, and a sensor used for measuring pressure in the airbag. The fluid pump and the pressure sensor each is connected to the airbag through a corresponding airflow channel, and an air supply port corresponding to the fluid pump and an air intake port corresponding to the sensor are usually disposed in parallel, to respectively implement a function of supplying air to the airbag and a function of allowing air in the airbag to flow to the sensor.

However, because a wearable device is usually compact in size, a spacing between ports of airflow channels is small. During measurement, airflow impact may occur when the fluid pump supplies air to the airbag, thereby interfering with measurement by the sensor and affecting measurement accuracy.

SUMMARY

This application provides an electronic device for measuring blood pressure, to achieve high blood pressure measurement accuracy.

This application provides an electronic device for measuring blood pressure, including a measurement assembly, an airbag, and a fluid pipeline connected between the measurement assembly and the airbag. The measurement assembly includes a fluid pump and a pressure sensor. The fluid pump is connected to the airbag through a first fluid pipeline. The pressure sensor is connected to the airbag through a second fluid pipeline. The first fluid pipeline has a first nozzle connected to the airbag. The second fluid pipeline has a second nozzle connected to the airbag. The first nozzle and the second nozzle are located on a same side of the airbag, and an opening direction of one of the first nozzle and the second nozzle is away from that of the other, so that the first nozzle and the second nozzle are away from each other. In this way, when the fluid pump in the electronic device for measuring blood pressure supplies fluid to the airbag, the fluid that comes from the fluid pump flows in a direction away from a nozzle of the pressure sensor, and there is a specific spacing between a nozzle of the fluid pump and the nozzle of the pressure sensor, so that the nozzle of the pressure sensor is not subject to direct impact of the fluid, and is subject to small impact and influence. This can prevent impact of the fluid from affecting detection by the pressure sensor, and achieve high blood pressure measurement accuracy.

In an optional implementation, one of the first fluid pipeline and the second fluid pipeline forms an outer pipe section, and the other forms an inner pipe section. The outer pipe section is sleeved outside the inner pipe section, and there is a gap between an outer wall of the inner pipe section and an inner wall of the outer pipe section. A junction between the nested fluid pipelines and the airbag occupies small space, so that the airbag and the entire electronic device for measuring blood pressure have a more compact structure, thereby facilitating the electronic device for measuring blood pressure to be miniaturized and portable.

In an optional implementation, at least one of the first fluid pipeline and the second fluid pipeline has a built-in pipe section that extends into the airbag, so that at least one of the first nozzle and the second nozzle is located in the airbag. In this way, the built-in pipe section extends into the airbag, so that there may be a large spacing between the two nozzles. Only a direction of the first nozzle or the second nozzle that extends into the airbag needs to be controlled to make the two nozzles away from each other. A structure of the fluid pipes is simple.

In an optional implementation, one of the first nozzle and the second nozzle extends into the airbag and is suspended, and the other is flush with an inner wall of the airbag. In this way, when inner space of the airbag is limited, one of the nozzles is disposed at a location flush with the inner wall of the airbag, so that the second nozzle and the first nozzle can be away from each other as far as possible. This helps reduce influence of airflow that rushes out of the first nozzle on the second nozzle.

In an optional implementation, the built-in pipe section includes a bent section, and there is an included angle between a pipe section of the built-in pipe section that is located before the bent section and a pipe section of the built-in pipe section that is located after the bent section. In this way, when airflow of the fluid pump rushes out of the first nozzle, the airflow does not cause direct impact on the second nozzle. In addition, because the first fluid pipeline has an extension section, there is a specific spacing between the first nozzle and the second nozzle. This can ensure stable air intake at the second nozzle, so that the pressure sensor is subject to small interference when performing detection.

In an optional implementation, the pipe section of the built-in pipe section that is located before the bent section is perpendicular to the pipe section of the built-in pipe section that is located after the bent section. This reduces an airflow velocity of airflow in the first fluid pipeline, and reduces influence of the first nozzle on the second nozzle.

In an optional implementation, the built-in pipe section is located in the first fluid pipeline, and the second fluid pipeline extends to a location flush with the inner wall of the airbag.

In an optional implementation, the built-in pipe section is a flexible pipe section, and the built-in pipe section is attached to the inner wall of the airbag. In this way, the built-in pipe section can move and deform accordingly with expansion or contraction of the airbag, without detaching from the inner wall of the airbag. In addition, the first fluid pipeline may expand or collapse accordingly with deformation of the airbag, without forming a rigid protrusion in the airbag, thereby ensuring comfortable wearing for a testee.

In an optional implementation, the built-in pipe section is a rigid pipe section. The built-in pipe section is suspended in the airbag, and there is a spacing between the first nozzle and the inner wall of the airbag. In this way, the built-in pipe section has specific rigidity. After extending to the inner wall of the airbag, the built-in pipe section can maintain the form, and keep a specific spacing from the inner wall of the airbag, without being attached to the inner wall of the airbag due to bending or flexible collapsing of the built-in pipe section.

In an optional implementation, pipe sections of the first fluid pipeline have an integrated structure. In this way, the entire first fluid pipeline can be uniformly manufactured and molded, thereby reducing difficulty of assembly and manufacturing.

In an optional implementation, the built-in pipe section is located in the second fluid pipeline, and the first fluid pipeline extends to a location flush with the inner wall of the airbag.

In an optional implementation, the built-in pipe section is suspended in the airbag, and there is a spacing between the second nozzle and the inner wall of the airbag, or the built-in pipe section is attached to the inner wall of the airbag. In this way, similar to the case of the first fluid pipeline, the built-in pipe section of the second fluid pipeline may extend to different locations in the airbag.

In an optional implementation, when the electronic device for measuring blood pressure is put on a human body, a location of the second nozzle in the airbag corresponds to a location of an artery of the human body. Because the artery is close to the second nozzle, an air pressure change at the second nozzle responds to blood impact in the artery in a timely manner, and detection by the pressure sensor is fast and direct. In addition, the pressure change at the second nozzle is less affected by other parts of the airbag, thereby improving detection accuracy. In this way, the second nozzle may collect an airbag pressure change status at a location near the artery, so that detection by the pressure sensor has a high response speed and high accuracy.

In an optional implementation, the built-in pipe section is a rigid pipe section. In this way, even if the airbag presses against the second fluid pipeline due to reduction of inner space, the built-in pipe section of the second fluid pipeline still retains an original shape and cross-sectional area, thereby maintaining normal airflow in the second fluid pipeline, and preventing the airbag from collapsing and hindering normal detection by the pressure sensor.

In an optional implementation, pipe sections of the second fluid pipeline have an integrated structure. In this way, the second fluid pipeline can be uniformly manufactured and molded, thereby reducing difficulty of assembly and manufacturing.

In an optional implementation, the electronic device for measuring blood pressure further includes a fluid valve and a third fluid pipeline. A first end of the third fluid pipeline is connected to the fluid valve, and a second end of the third fluid pipeline is connected to the airbag. By using the fluid valve, the inflated airbag may be deflated, and the pressure sensor detects an airbag pressure change status during the deflation, to obtain a measured value of blood pressure.

In an optional implementation, the second end of the third fluid pipeline is connected to the first fluid pipeline. In this way, a junction between the fluid pipelines and the airbag occupies small space, so that limited surface space of the airbag can be effectively utilized, thereby facilitating miniaturization and compaction of the airbag and the entire electronic device for measuring blood pressure. In addition, airflow in the third fluid pipeline does not interfere with the second fluid pipeline, and therefore has small impact on detection by the pressure sensor.

In an optional implementation, at least some pipe sections of the first fluid pipeline are flexible pipe sections capable of collapsing, and the second end of the third fluid pipeline is connected to the second fluid pipeline. In this way, even if the first fluid pipeline collapses due to a pressure change when the fluid pump is not operating, the third fluid pipeline can still perform ventilation normally to ensure a deflation operation.

In an optional implementation, the electronic device for measuring blood pressure further includes a body and a wrist strap. The wrist strap is connected to the body, the measurement assembly is disposed inside a housing of the body, and the airbag is disposed on the wrist strap. In this way, the electronic device for measuring blood pressure can measure blood pressure of a wearer by using the wrist strap that is put on a wrist, an upper arm, or another body part of the wearer.

The electronic device for measuring blood pressure includes the airbag and the measurement assembly. The measurement assembly includes a processing unit, the fluid pump, and the pressure sensor. The fluid pump and the sensor are both electrically connected to the processing unit. Fluid pipelines include the first fluid pipeline connected between the fluid pump and the airbag, and the second fluid pipeline connected between the pressure sensor and the airbag. The first fluid pipeline has the first nozzle connected to the airbag, and the second fluid pipeline has the second nozzle connected to the airbag. An opening direction of one of the first nozzle and the second nozzle is away from that of the other, so that the first nozzle and the second nozzle are away from each other. In this way, when the fluid pump in the electronic device for measuring blood pressure supplies fluid to the airbag, fluid that rushes out of the first nozzle flows in a direction away from the second nozzle, and there is a specific spacing between the first nozzle and the second nozzle, so that the second nozzle is not subject to direct impact of the fluid, and is subject to small impact and influence. This can prevent impact of the fluid from affecting detection by the pressure sensor, and achieve high blood pressure measurement accuracy.

DESCRIPTION OF REFERENCE SIGNS

Figure 1:
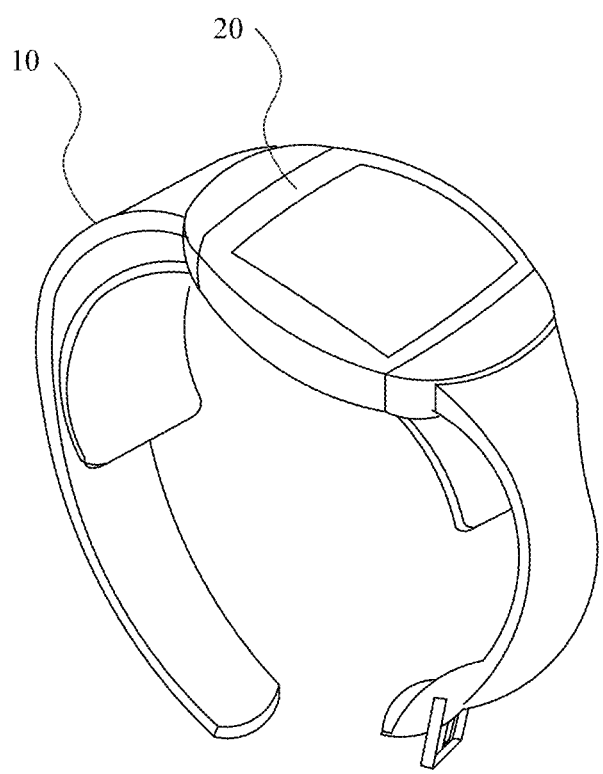
FIG. 1 is a schematic diagram of an outline of an electronic device for measuring blood pressure when the electronic device is a wearable device according to an embodiment of this application.

1: airbag; 2: measurement assembly; 3: first fluid pipeline; 4: second fluid pipeline; 5: third fluid pipeline;

11: first inner wall; 12 and 13: bonding agent; 20: processing unit; 21: fluid pump; 22: pressure sensor; 23: fluid valve; 30: fluid pipeline; 31: first pipe section; 32: second pipe section; 41: second bent section; 42: third pipe section; 43: fourth pipe section;

110: RF circuit; 111: antenna; 120: memory; 130: another input device; 140: screen; 141: display panel; 142: touch panel; 150: another sensor; 160: audio circuit; 170: I/O subsystem; 171: controller of the another input device; 172: sensor controller; 173: display controller; 201: housing; 301: first nozzle; 321: first extension section; 322: second extension section; 323: first bent section; 401: second nozzle; 431: third extension section; 432: fourth extension section; 433: third bent section; 501: body; 502: wrist strap; 503: wrist;

100, 200, 300, and 400: electronic device for measuring blood pressure; and c: radial artery.

DESCRIPTION OF EMBODIMENTS

Before embodiments of this application are described, for ease of understanding technical solutions of this application, basic concepts and terms included in embodiments of this application are described first.

Blood pressure (BP): lateral pressure acting on a side wall of a blood vessel per unit area when blood flows in the blood vessel. Blood pressure is a main driver of blood flow. Blood pressure of a human body needs to be kept within a normal fluctuation range, excessively high or low blood pressure has adverse effects on human health. Blood pressure is referred to as arterial blood pressure, venous blood pressure, and capillary blood pressure due to different blood vessels. Blood pressure in anthropometry is generally arterial blood pressure.

Blood pressure measurement through oscillometry: A pulse envelope sourcing from a blood vessel wall is obtained through vibration caused by blood colliding with the blood vessel wall when flowing, and a blood pressure value is obtained by using a relationship between the pulse envelope and arterial blood pressure. Oscillometry may specifically include an amplitude coefficient method, a waveform characteristic method, and the like. Specifically, during measurement, an airbag or the like is bound to a limb of a human being, and the airbag is pressurized, to detect vibration or pressure caused by impact of blood in the human body under pressure of the airbag.

Currently, as people attach more importance to health, people pay increasing attention to measurement of human body indexes such as blood pressure. To measure blood pressure anytime and anywhere, electronic sphygmomanometers or other electronic devices with a blood pressure measurement function are widely used. To balance device portability and measurement accuracy, an electronic sphygmomanometer or an electronic device with a blood pressure measurement function usually measures blood pressure through oscillometry. For ease of description, the electronic sphygmomanometer and the electronic device with a blood pressure measurement function are collectively referred to as an electronic device for measuring blood pressure in the following descriptions. It can be understood that the electronic device for measuring blood pressure includes but is not limited to an electronic sphygmomanometer, a mobile phone, an intelligent wearable device, and the like.

Figure 2:
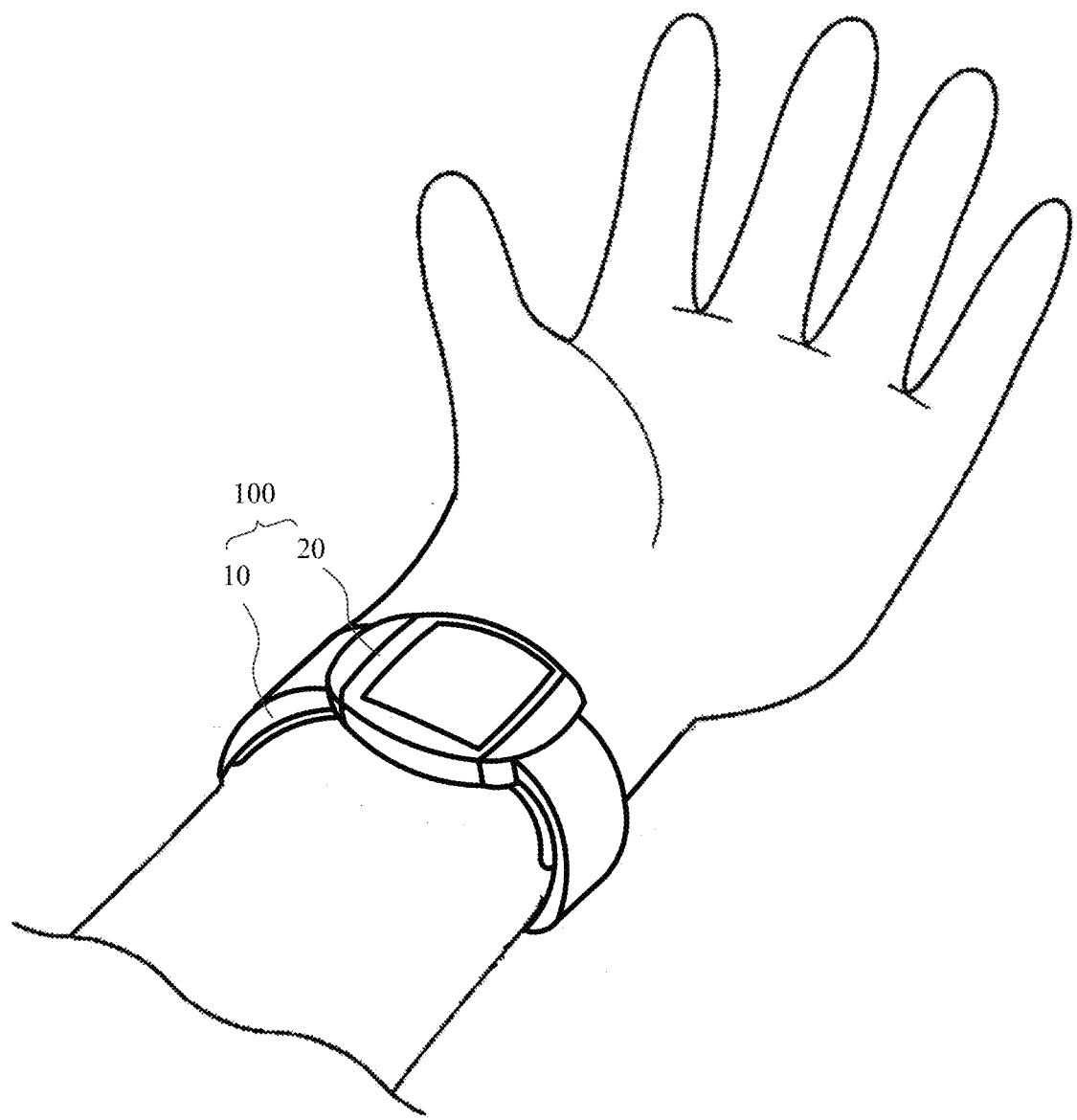
FIG. 2 is a schematic diagram of a location at which the electronic device for measuring blood pressure in FIG. 1 is put on a wrist of a human body.

An example in which the electronic device for measuring blood pressure is a wearable device is used in the following descriptions. FIG. 1 is a schematic diagram of an outline of an electronic device for measuring blood pressure when the electronic device is a wearable device according to an embodiment of this application. FIG. 2 is a schematic diagram of a location at which the electronic device for measuring blood pressure in FIG. 1 is put on a wrist of a human body. As shown in FIG. 1 and FIG. 2, when the electronic device 100 for measuring blood pressure is a wearable device, the electronic device 100 for measuring blood pressure has components such as a body 20 and a wrist strap 10. The body 20 may be put on a wrist, an upper arm, or another body part of a wearer by using the wrist strap 10 or the like. In this case, the electronic device for measuring blood pressure may perform a blood pressure measurement function, another common function of a wearable device, and the like.

Figure 3A:
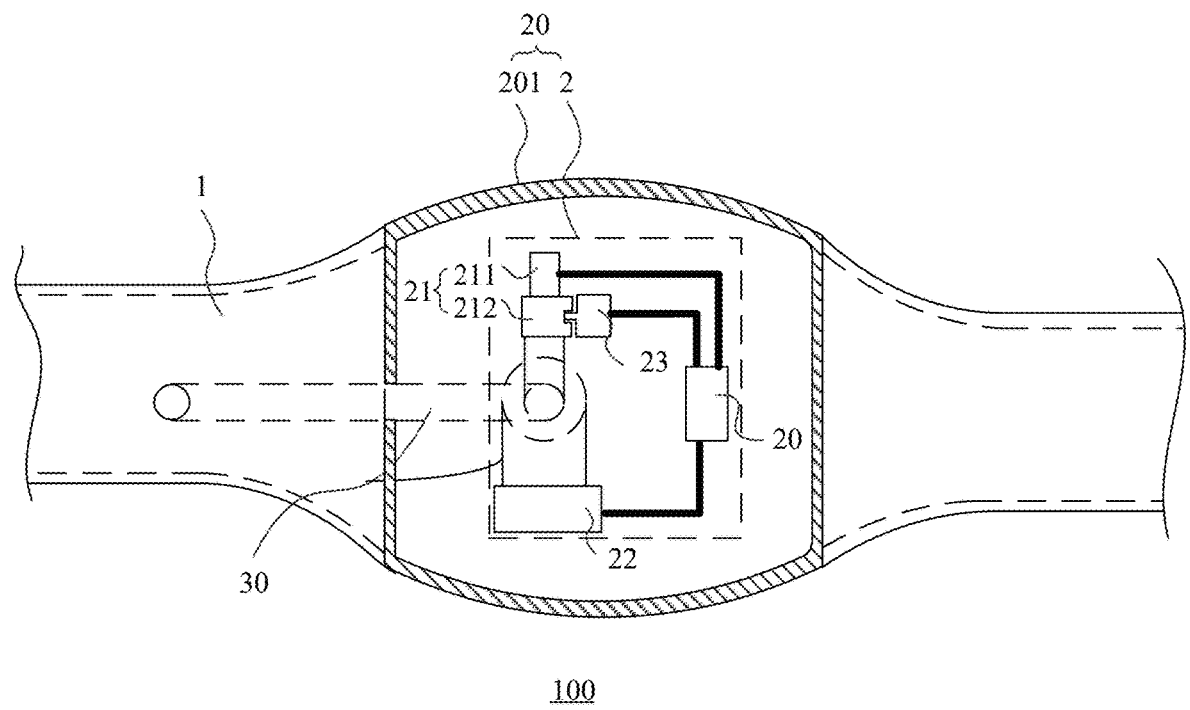
FIG. 3a is a schematic diagram of an internal structure of the electronic device for measuring blood pressure in FIG. 1.
Figure 3B:
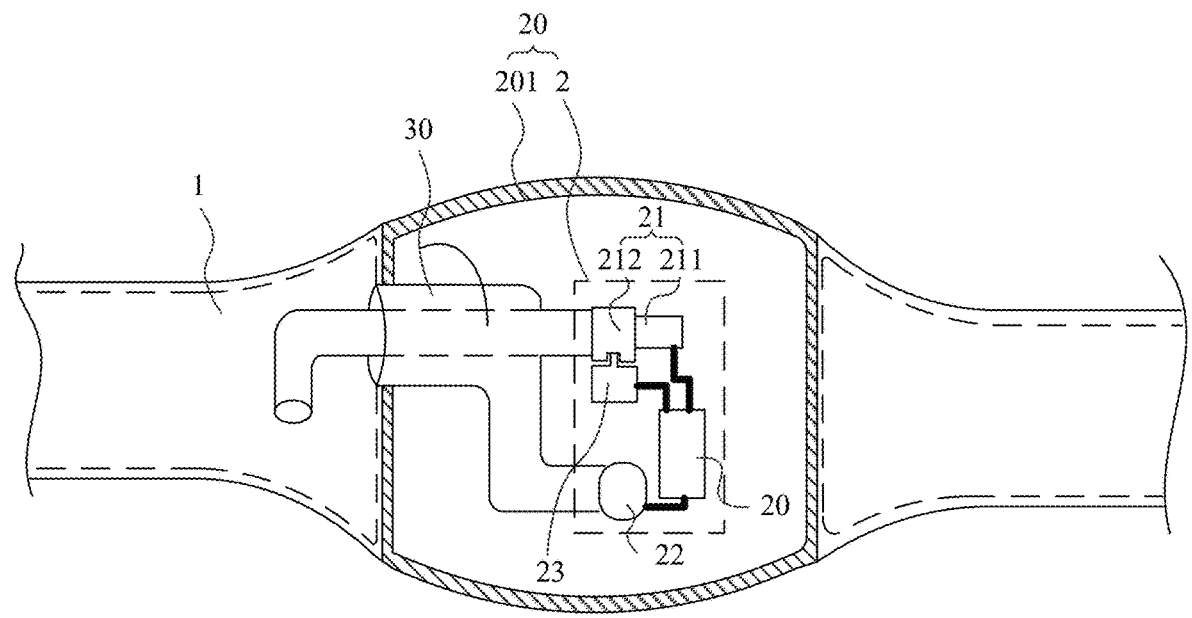
FIG. 3b is a schematic diagram of another internal structure of the electronic device for measuring blood pressure in FIG. 1.

FIG. 3a is a schematic diagram of an internal structure of the electronic device for measuring blood pressure in FIG. 1. FIG. 3b is a schematic diagram of another internal structure of the electronic device for measuring blood pressure in FIG. 1. As shown in FIG. 3a and FIG. 3b, to measure blood pressure through oscillometry, the electronic device 100 for measuring blood pressure may generally include components such as an airbag 1, a measurement assembly 2, and a fluid channel 30 connected between the airbag 1 and the measurement assembly 2. In the electronic device 100 for measuring blood pressure in FIG. 3a, the airbag 1 extends to a bottom of a housing 201 in the electronic device 100 for measuring blood pressure, and the fluid channel 30 is connected to the airbag 1 through the bottom of the housing 201. In the electronic device 100 for measuring blood pressure in FIG. 3b, the airbag 1 extends only to a side of the housing 201, and the fluid channel 30 is connected to the airbag 1 through the side of the housing 201.

The airbag 1 is a component directly acting on a human body in the electronic device 100 for measuring blood pressure. The airbag 1 may have a plurality of different structures and forms, for example, may be attached to a cuff or the wrist strap 10. In this case, the airbag 1 may surround and be bound to a limb of a testee, for example, is bound to an upper arm or a wrist of the testee. The airbag 1 is mainly made of a flexible material. Therefore, when the airbag 1 is inflated, a size of the airbag 1 changes, and an outer wall of the airbag 1 presses against the limb of the testee accordingly. As a type of the electronic device varies, the airbag 1 may be an independent structure, or may be attached to another structure of the electronic device for measuring blood pressure. For example, when the electronic device for measuring blood pressure is a smartwatch or a smart band, the airbag 1 may be correspondingly disposed on a wristband of the smartwatch or a body of the smart band. For example, as shown in FIG. 1 and FIG. 2, the airbag 1 may be disposed on an inner side of the wrist strap 10, to be specific, a side, of the wrist strap 10, that is in contact with a limb of a user.

As a main functional element in the electronic device 100 for measuring blood pressure, the measurement assembly 2 may be specifically located in the body 20 of the wearable device, for example, is accommodated in the housing 201 of the body 20. The measurement assembly 2 may include various components such as a processing unit 20, a fluid pump 21, a pressure sensor 22, and a fluid valve 23. The processing unit 20 may be a component with control and data processing functions, connects various parts of the entire electronic device 100 for measuring blood pressure by using various interfaces and lines, and performs various functions of the electronic device 100 for measuring blood pressure and processes data, to perform overall monitoring on operating of the electronic device 100 for measuring blood pressure. For example, the processing unit 20 may be a central processing unit (CPU), a graphics processing unit (GPU), a field programmable gate array (FPGA), or a micro controller unit (MCU). Optionally, the processing unit 20 may be an independent module, or may be integrated with a control circuit or another component of the electronic device for measuring blood pressure. The fluid pump 21, the fluid valve 23, and the pressure sensor 22 are all electrically connected to the processing unit 20 in the measurement assembly 2, so that the processing unit 20 can control actions of the fluid pump 1 and the fluid valve 23 and receive a pressure signal detected by the pressure sensor 22. To receive a control signal of the processing unit, the fluid pump 21 and the fluid valve 23 are both electrically controlled elements, and are electrically connected to the processing unit 20.

In an optional manner, the fluid pump 21 may include components such as a motor 211 and a pump body 212. The pump body 212 may drive, by using a piston or an impeller, fluid to advance, and the motor 211 and the processing unit 20 remain electrically connected. In addition, in this scenario, the fluid valve 23 may be an electromagnetic valve, and the pressure sensor 22 may be a piezoelectric resistive pressure sensor, or the like. Therefore, the motor 211, the pressure sensor 22, and the fluid valve 23 may be all electrically connected to the processing unit 20, to implement signal transmission and control.

To connect the fluid pump 21, the pressure sensor 22, and the fluid valve 23 to the airbag 1, the fluid channel 30 is provided between the measurement assembly 2 and the airbag 1. The fluid channel 30 may be formed by a rigid or flexible sealed pipeline. Fluid flowing through the fluid channel 30 and the airbag 1 may be generally air. To connect different components in the measurement assembly 2, the fluid channel 30 may include an air supply channel connected between the airbag 1 and the fluid pump 21, a deflation channel connected between the airbag 1 and the fluid valve 23, a detection channel connected between the airbag 1 and the pressure sensor 22, and the like. Because the fluid pump 21, the pressure sensor 22, and the fluid valve 23 in the measurement assembly 2 need to be separately connected to the airbag 1, correspondingly, there may also be a plurality of fluid channels 30, and different air channels may connect different elements. It should be noted that the fluid channel in FIG. 3 is merely intended to indicate an overall connection status between the components in the measurement assembly 2 and the airbag 1. For a specific shape and implementation form of the fluid channel, refer to descriptions in the following specific scenarios.

It can be understood that the fluid channel 30 may be combined with other components in the electronic device 100 for measuring blood pressure. For example, a connector may be disposed between the airbag 1 and the measurement assembly 2, and the fluid channel 30 is provided in the connector.

It can be understood that the electronic device for measuring blood pressure may further have other functions in addition to performing a blood pressure measurement operation. Correspondingly, the electronic device for measuring blood pressure may include other components or structures, and some or all of these components and structures may be disposed in the measurement assembly 2.

Figure 4:
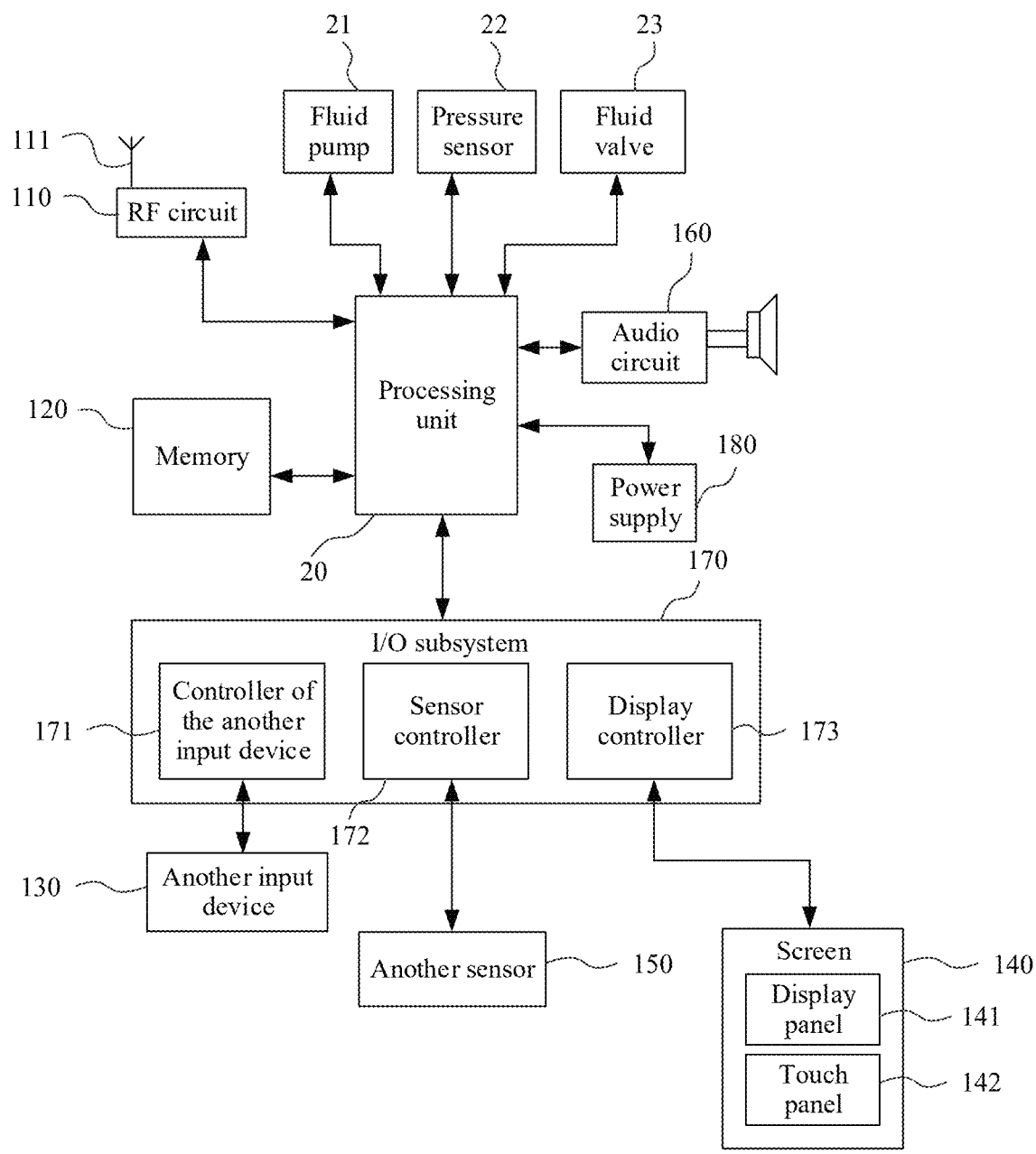
FIG. 4 is a block diagram of a partial internal structure of a measurement assembly in the electronic device for measuring blood pressure in FIG. 1.

The following describes another possible partial internal structure of the electronic device for measuring blood pressure by using an example in which the electronic device for measuring blood pressure is a wearable device. FIG. 4 is a block diagram of a partial internal structure of the measurement assembly in the electronic device for measuring blood pressure in FIG. 1. As shown in FIG. 4, to implement various functions and operations of the wearable device, in addition to components such as the processing unit 20, the fluid pump 21, and the pressure sensor 22, the measurement assembly of the wearable device may further include a radio frequency (RF) unit 110, a memory 120, another input device 130, a screen 140, another sensor 150, an audio circuit 160, an I/O subsystem 170, and a power supply 180. A person skilled in the art can understand that the wearable device structure shown in FIG. 4 does not constitute a limitation on the wearable device. The wearable device may include more or fewer components than those shown in the figure, or some components may be combined, or there may be a different component layout.

For ease of understanding an overall structure of the measurement assembly 2, the following describes the constituent components of the measurement assembly 2 in detail with reference to FIG. 3.

The RF unit 110 may be configured to receive and send signals in a process of receiving and sending information or during a call. Specifically, after receiving downlink information of a base station, the RF unit 110 sends the downlink information to the processor 180 for processing. In addition, the RF unit 110 sends uplink data to the base station. Usually, the RF unit 110 is connected to the antenna 111, to communicate with a network and another device by using the antenna 111. The RF unit 111 includes but is not limited to at least one amplifier, a transceiver, a coupler, a low noise amplifier (LNA), a duplexer, or the like.

The memory 120 may be configured to store a software program and a module. The processing unit 20 runs the software program and the module that are stored in the memory 120 to perform various function applications of the wearable device and data processing. The memory 120 may mainly include a program storage area and a data storage area. The program storage area may store an operating system, an application program that is required by at least one function (such as a sound playing function or an image display function), and the like. The data storage area may store data (such as audio data or a phone book) created in a process of using the wearable device, and the like. In addition, the memory 120 may include a high-speed random access memory, and may further include a non-volatile memory, for example, at least one magnetic disk storage device, a flash storage device, or another volatile solid-state storage device.

To enable the wearable device to perform interactive operations such as display and input, the wearable device includes the another input device 130, the screen 140, the another sensor 150, the audio circuit 160, and the like. The another input device 130 may be configured to: receive input digit or character information, and generate a key signal input related to user setting and function control of the mobile terminal 100. The another input device 130 is connected to a controller 171 of the another input device in the I/O subsystem 170, and performs signal interaction with the processing unit 20 under control of the controller 171 of the another input device. The screen 140 may be configured to display information entered by a user or information provided for a user, and various menus of the wearable device, and may further receive input from the user. Specifically, the screen 140 may include a display panel 141, a touch panel 142, and the like. In addition, the another sensor 150 included in the wearable device may recognize and sense parameter information of an ambient environment of the wearable device, human physiological information of a wearer, and the like. Specifically, the another sensor 150 may include an optical sensor, a motion sensor, a gyroscope, a barometer, a hygrometer, a thermometer, an infrared sensor, and the like, to sense the parameter information of the ambient environment of the wearable device.

The I/O subsystem 170 is configured to control an external input/output device, and a display controller 173 in the I/O subsystem 170 receives a signal from the screen 140 and/or sends a signal to the screen 140. After the screen 140 detects a user input, the display controller 173 converts the detected user input into interaction with a user interface object displayed on the screen 140, to implement man-machine interaction. The sensor controller 172 may receive a signal from one or more sensors 150 and/or send a signal to one or more sensors 150.

In addition, the measurement assembly 2 further includes the power supply 180 that supplies power each component, and another component or structure. Details are not described herein again.

Figure 5A:
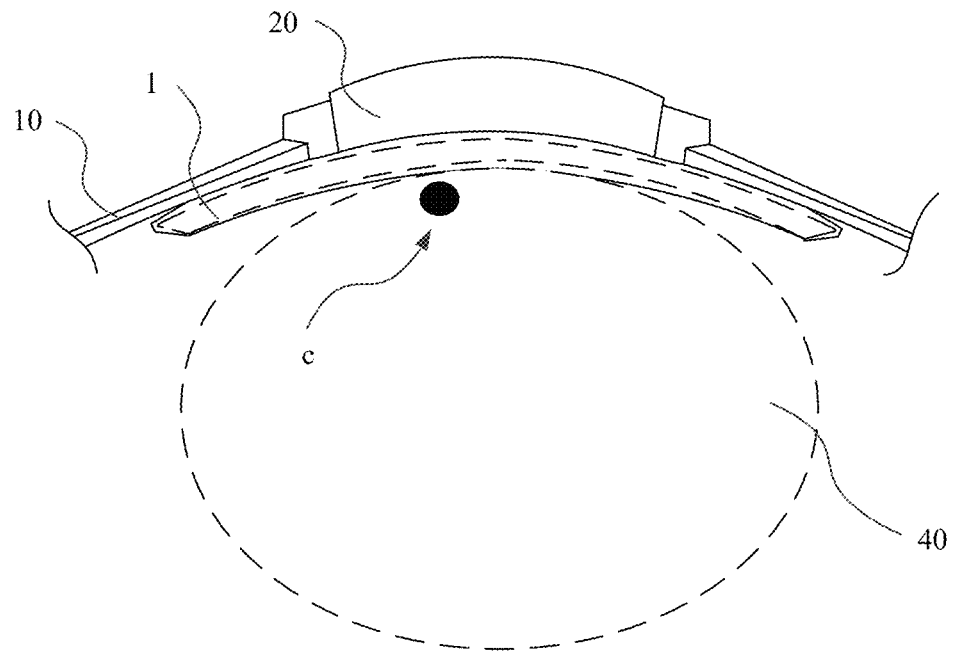
FIG. 5a is a side view of the electronic device for measuring blood pressure in FIG. 1 when the electronic device does not perform blood pressure measurement.
Figure 5B:
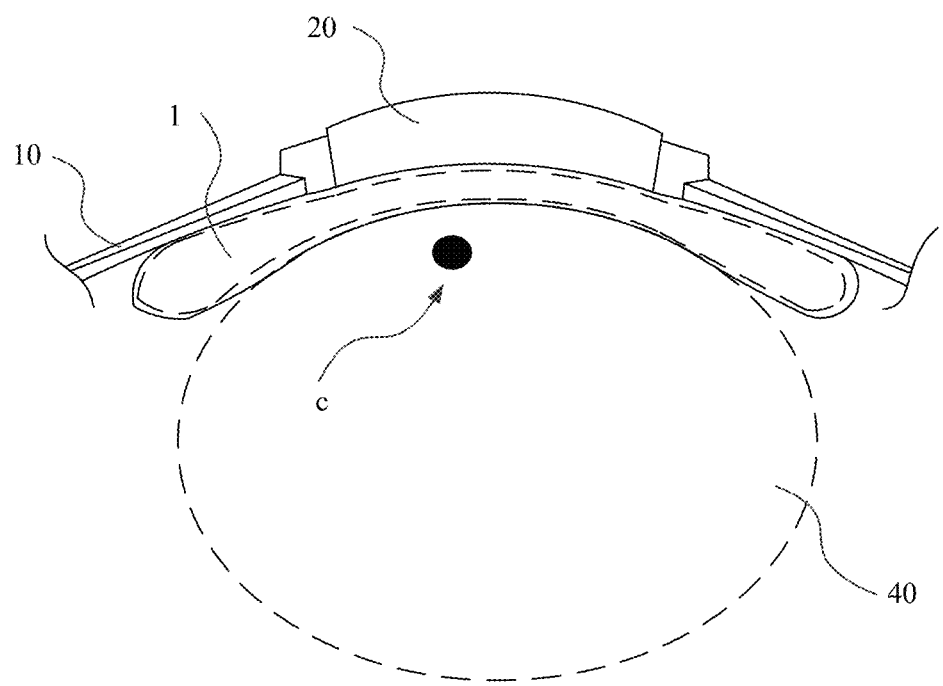
FIG. 5b is a side view of the electronic device for measuring blood pressure in FIG. 1 in a blood pressure measurement state.
Figure 6A:
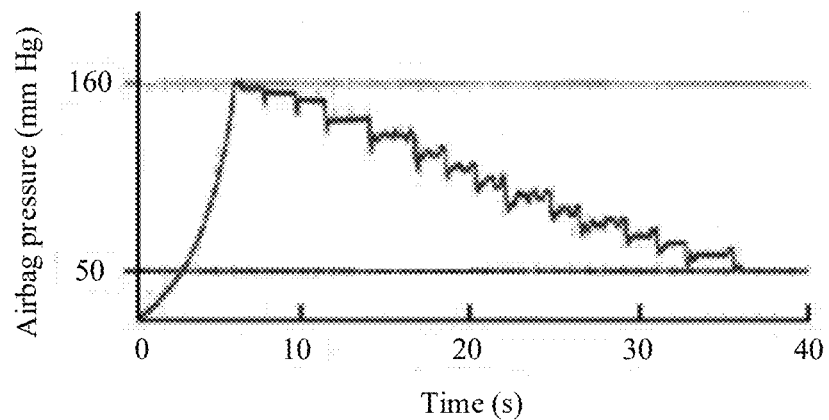
FIG. 6a is a schematic diagram of airbag pressure changes during measurement by an electronic device for measuring blood pressure.
Figure 6B:
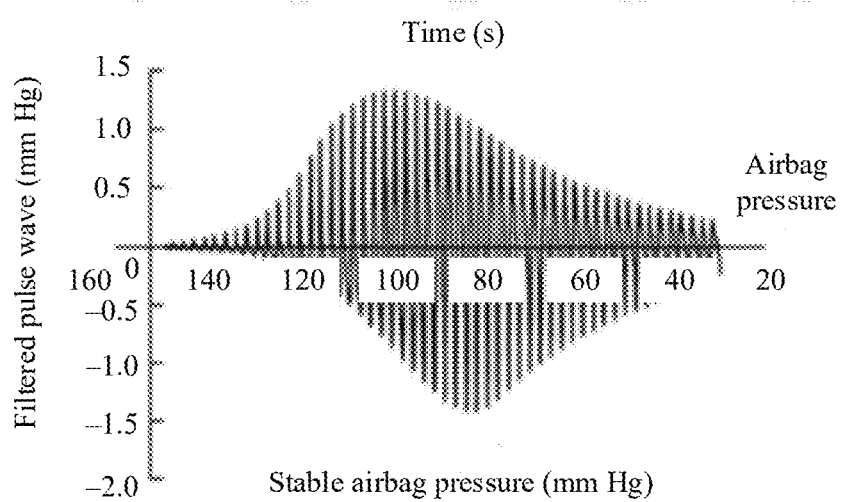
FIG. 6b is a schematic diagram of a waveform of an airbag pressure pulse wave formed during measurement by an electronic device for measuring blood pressure.
Figure 6C:
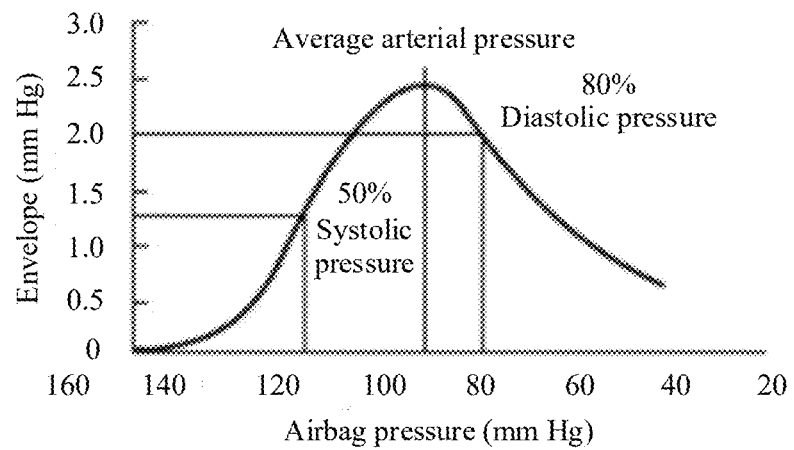
FIG. 6c is a schematic diagram of an envelope curve of a pressure pulse wave obtained during measurement by an electronic device for measuring blood pressure.

When the electronic device for measuring blood pressure with the foregoing integrated structure measures blood pressure of the testee, the airbag 1 is first bound to the limb of the testee, and then the airbag 1 is inflated by using the fluid pump 21, so that the outer wall of the airbag 1 presses against a blood vessel of the testee. FIG. 5a is a side view of the electronic device for measuring blood pressure in FIG. 1 when the electronic device does not perform blood pressure measurement. FIG. 5b is a side view of the electronic device for measuring blood pressure in FIG. 1 in a blood pressure measurement state. As shown in FIG. 5a and FIG. 5b, the structure of the electronic device for measuring blood pressure in which the fluid channel 30 is connected to the airbag 1 through the bottom of the housing 201 is used as an example. During blood pressure measurement, the size of the airbag 1 changes as the airbag 1 is inflated. In this case, the airbag 1 disposed on the inner side of the wrist strap 10 exerts a force on a wrist 40 of the user in a circumferential direction of the wrist 40 of the user, to press against a blood vessel at a radial artery c. Accordingly, blood in the blood vessel at the radial artery c causes impact on a blood vessel wall and causes fluctuation of air pressure in the airbag. FIG. 6a is a schematic diagram of airbag pressure changes during measurement by the electronic device for measuring blood pressure. As shown in FIG. 6a, after the airbag 1 is inflated to specific pressure (160 mm Hg in the figure), the airbag 1 is slowly deflated, so that pressure in the airbag 1 gradually decreases until rated pressure (50 mm Hg in the figure) is reached. During deflation of the airbag 1, the blood causes impact to the blood vessel wall under an action of blood pressure. Therefore, under an action of the impact, the air pressure in the airbag 1 does not change smoothly, but fluctuates several times within a small range. The pressure sensor 22 may detect the fluctuation of the air pressure through the detection channel, and send the fluctuation to the processing unit 20 for subsequent processing. FIG. 6b is a schematic diagram of a waveform of an airbag pressure pulse wave formed during measurement by the electronic device for measuring blood pressure. As shown in FIG. 6b, after obtaining the fluctuation of the air pressure, the processing unit 20 may extract, through signal processing and calculation, a fluctuation signal superposed on the pressure of the airbag 1, to obtain the pressure pulse wave. FIG. 6c is a schematic diagram of an envelope curve of a pressure pulse wave obtained during measurement by the electronic device for measuring blood pressure. As shown in FIG. 6c, after the processing unit 20 performs envelope processing on the pressure pulse wave and corresponding conversion, a blood pressure change of the testee during measurement can be obtained, and blood pressure information such as systolic pressure and diastolic pressure can be extracted from the pressure pulse wave. After the measurement is completed, the processing unit 20 controls the fluid valve 23 to be opened, so that the airbag 1 is deflated through the deflation channel, to relieve pressure against the testee.

It can be learned from the foregoing measurement process that, when the electronic device 100 for measuring blood pressure implements measurement, the fluid pump 21 needs to inflate the airbag 1, and the pressure sensor 22 is connected to the airbag 1 through the detection channel, to detect a pressure change status in the airbag 1. However, in an entire measurement process of the pressure sensor 22, the airbag 1 undergoes a complete inflation and deflation process from inflation to deflation. In the inflation and deflation process, especially in the inflation process, the fluid pump 21 pressurizes the airbag 1 through an air supply pipeline, and causes specific airflow impact in the air supply pipeline and the airbag 1. However, in a conventional electronic device for measuring blood pressure, for example, an electronic sphygmomanometer, an air supply port of an air supply pipeline and an air intake port of a detection pipeline are disposed in parallel, and the two ports are disposed near each other. Therefore, airflow impact caused by the fluid pump 21 affects air pressure near the air intake port of the detection pipeline, thereby interfering with normal detection by the pressure sensor, and affecting accuracy of blood pressure detection by the electronic device 100 for measuring blood pressure.

Therefore, this application provides an electronic device for measuring blood pressure. When the electronic device for measuring blood pressure detects blood pressure of a testee, airflow impact caused by inflation of a fluid pump 21 is small, and a pressure sensor 22 in the electronic device has high measurement accuracy. To further describe the electronic device for measuring blood pressure in this application, the following describes in detail a specific structure and various possible implementation forms of the electronic device for measuring blood pressure by using different scenarios as examples.

Scenario 1

Figure 7:
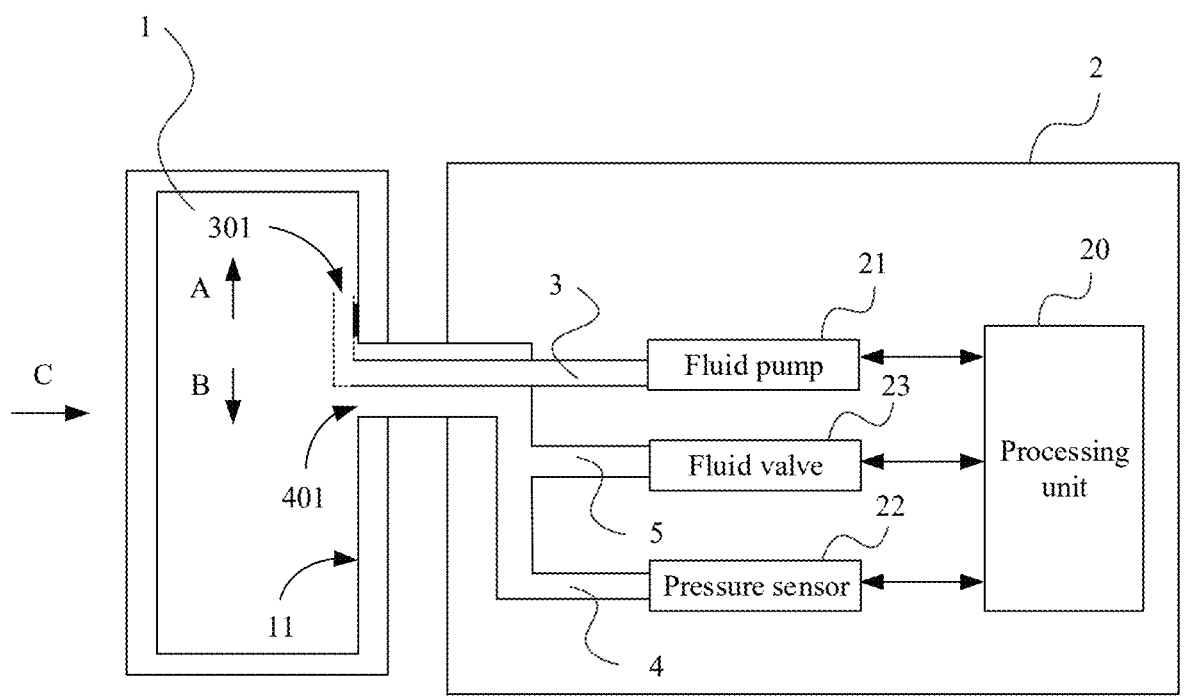
FIG. 7 is a schematic diagram of a structure of an electronic device for measuring blood pressure according to an embodiment of this application.

FIG. 7 is a schematic diagram of a structure of an electronic device for measuring blood pressure according to an embodiment of this application. As shown in FIG. 7, the electronic device 100 for measuring blood pressure provided in this application specifically includes different components such as an airbag 1 and a measurement assembly 2. The measurement assembly 2 is located in a body 20 of the electronic device 100 for measuring blood pressure, and the measurement assembly 2 includes a processing unit 20, a fluid pump 21, and a pressure sensor 22. The fluid pump 21 and the sensor 22 are both electrically connected to the processing unit 20, to perform a corresponding action or a detection operation under control of the processing unit 20. To implement connection between the airbag 1 and the measurement assembly 2, the electronic device for measuring blood pressure further includes a fluid pipeline. There are a plurality of fluid pipelines that are connected between the airbag 1 and different components. Specifically, the fluid pipelines include a first fluid pipeline 3 connected between the fluid pump 21 and the airbag 1, and a second fluid pipeline 4 connected between the pressure sensor 22 and the airbag 1. The first fluid pipeline 3 has a first nozzle 301 connected to the airbag 1, and the second fluid pipeline 4 has a second nozzle 401 connected to the airbag 1. An opening direction of one of the first nozzle 301 and the second nozzle 401 is away from that of the other, so that the first nozzle 301 and the second nozzle 401 are away from each other.

In this case, some pipe sections of at least one of the first fluid pipeline 3 and the second fluid pipeline 4 extend into the airbag 1. Therefore, at least one of the first nozzle 301 and the second nozzle 401 extends into the airbag 1. A pipe section that is of the first fluid pipeline 3 or the second fluid pipeline 4 and that extends into the airbag 1 may be defined as a built-in pipe section.

Specifically, both the first nozzle 301 and the second nozzle 401 may extend into the airbag 1; or one of the first nozzle 301 or the second nozzle 401 may extend into the airbag 1, and the other is connected to an inner wall of the airbag 1. When both the first nozzle 301 and the second nozzle 401 extend into the airbag 1, opening directions of the first nozzle 301 and the second nozzle 401 may be away from each other. However, when only one of the first nozzle 301 and the second nozzle 401 extends into the airbag 1, the other is connected to the inner wall of the airbag 1, and therefore has a fixed opening direction. In this case, only a direction of the first nozzle 301 or the second nozzle 401 that extends into the airbag 1 needs to be controlled, so that the two nozzles are away from each other. A structure of the fluid pipeline 3 is simple. For ease of description, an example in which one of the first nozzle 301 and the second nozzle 401 extends into the airbag 1 and the other is only connected to the inner wall of the airbag 1 is used in the following descriptions.

Specifically, in this embodiment, some pipelines of the first fluid pipeline 3 may extend into the airbag 1, and correspondingly, the first nozzle 301 of the first fluid pipeline 3 may also be located in the airbag 1; and a pipe section of the second fluid pipeline 4 does not extend into the airbag 1, so that the second nozzle 401 of the second fluid pipeline 4 extends to a location at which the second nozzle 401 is connected to the inner wall of the airbag 1. In this case, an opening direction of the second nozzle 401 is toward inside of the airbag 1, and an opening direction of the first nozzle 301 is away from the second nozzle 401, to keep the first nozzle 301 and the second nozzle 401 away from each other.

To make the electronic device for measuring blood pressure compact in size and portable, the first fluid pipeline 3 and the second fluid pipeline 4 may be connected to a same side of the airbag 1. To be specific, the first fluid pipeline 3 and the second fluid pipeline 4 are generally parallel or approximately parallel to each other, and the first fluid pipeline 3 and the second fluid pipeline 4 are connected to the airbag 1 along a same direction or similar directions. In this case, the opening direction of the second nozzle 401 is consistent with an extension direction of the second fluid pipeline 4. To make the opening direction of the first nozzle 301 away from the second nozzle 401, a pipe section, of the first fluid pipeline 3, that extends into the airbag 1 may have a bent section. In this way, there is an included angle between a pipe section, of the first fluid pipeline 3, from the bent section to the first nozzle 301 and another pipe section of the first fluid pipeline 3, so that an orientation of the first nozzle 301 can be different from an original extension direction of the first fluid pipeline 3. Apparently, because the second fluid pipeline 4 and the first fluid pipeline 3 are connected to the airbag 1 along a same direction or similar directions, there is also an included angle between the second nozzle 401 and the first nozzle 301, that is, orientations of the first nozzle 301 and the second nozzle 401 are staggered from each other. In this case, there is also an included angle between the orientation of the first nozzle 301 and a direction of a line between the first nozzle 301 and the second nozzle 401, and a value of the included angle may be greater than 0° and less than 180°.

To further make the first nozzle 301 and the second nozzle 401 away from each other, the first nozzle 301 and the second nozzle 401 may be away from each other. In this case, because the opening direction of the first nozzle 301 is toward a side in the airbag 1, the second nozzle 401 may be disposed on a side, of the first nozzle 301, that is away from the opening direction. For example, after the first fluid pipeline 3 extends into the airbag 1, the first fluid pipeline 3 may be bent toward a first side of the airbag 1, namely, a direction A shown in the figure. In this way, the first nozzle 301 also faces this direction. The second nozzle 401 of the second fluid pipeline 4 may be at a location that faces a second side of the airbag 1 rather than the side that the first fluid pipeline 3 faces, namely, a direction B shown in the figure. It can be understood that, in this case, there is an included angle of roughly 90° between the orientation of the first nozzle 301 and the direction of the line between the first nozzle 301 and the second nozzle 401. Because the opening direction of the first nozzle 301 is away from the second nozzle 401, when the fluid pump 21 supplies fluid to the airbag 1, fluid that rushes out of the first nozzle 301 flows in a direction away from the second nozzle 401, and the second nozzle 401 is not subject to direct impact of the fluid, and is subject to small impact and influence. This can prevent impact of the fluid from affecting detection by the pressure sensor 22.

In addition, because the opening direction of the first nozzle 301 is away from the second nozzle 401, when the first fluid pipeline 3 extends in the airbag, a spacing between the first nozzle 301 and the second nozzle 401 can be increased, to reduce influence of airflow that rushes out of the first nozzle 301 on the second nozzle 401.

Specifically, it can be learned from the foregoing descriptions that some pipe sections of the first fluid pipeline 3 extend into the airbag 1, and these pipe sections have a bent section, so that the opening direction of the first nozzle 301 is different from the original extension direction of the first fluid pipeline 3. However, the second fluid pipeline 4 is connected only to the inner wall of the airbag 1, but does not extend into the airbag 1. In this case, the orientation of the second nozzle 401 may be considered as extending into the airbag 1 and being consistent with the original extension direction of the second fluid pipeline 4. Therefore, the opening direction of the first nozzle 301, namely, an air outlet direction of the fluid pump 21, is away from the second nozzle 401, and therefore when airflow of the fluid pump 21 rushes out of the first nozzle 301, the airflow of the fluid pump 21 does not cause direct impact on the second nozzle 401. In addition, because the first fluid pipeline 3 has an extension section, there is a specific spacing between the first nozzle 301 and the second nozzle 401. This can ensure stable air intake at the second nozzle 401, so that the pressure sensor 22 is subject to small interference when performing detection.

Optionally, an edge of the second nozzle 401 is flush with the inner wall of the airbag 1. This facilitates locating and connection between the second nozzle 401 and the airbag 1. In addition, when inner space of the airbag 1 is limited, the second nozzle 401 is disposed at a location flush with the inner wall of the airbag 1, so that the second nozzle 401 and the first nozzle 301 can be away from each other as far as possible. This helps reduce influence of airflow that rushes out of the first nozzle 301 on the second nozzle 401.

In an optional implementation, the first fluid pipeline 3 and the second fluid pipeline 4 may be nested. To be specific, the first fluid pipeline 3 and the second fluid pipeline 4 are connected to the inside of the airbag 1 at a same location.

Specifically, in the electronic device 200 for measuring blood pressure, to facilitate accommodation of the first fluid pipeline 3, some pipe sections of the second fluid pipeline 4 that are close to the airbag 1 have a large inner diameter, which enables the first fluid pipeline 3 to be disposed inside these pipe sections of the second fluid pipeline 4. In this way, the first fluid pipeline 3 forms an inner pipe section, the second fluid pipeline 4 forms an outer pipe section, and a gap in which fluid can flow can be formed between the inner pipe section and the outer pipe section. To enable fluid to flow into the first fluid pipeline 3 and the second fluid pipeline 4 separately, the first fluid pipeline 3 and the second fluid pipeline 4 are not connected to each other. In this case, because the second fluid pipeline 4 is connected to the airbag 1 through the second nozzle 401, a first end of the first fluid pipeline 3 may extend into the airbag 1 through the second nozzle 401, and form the first nozzle 301 and another pipe section that extends in the airbag 1; and the other end of the first fluid pipeline 3 penetrates a pipe wall of the second fluid pipeline 4 and is connected to the fluid pump 21.

Figure 8:
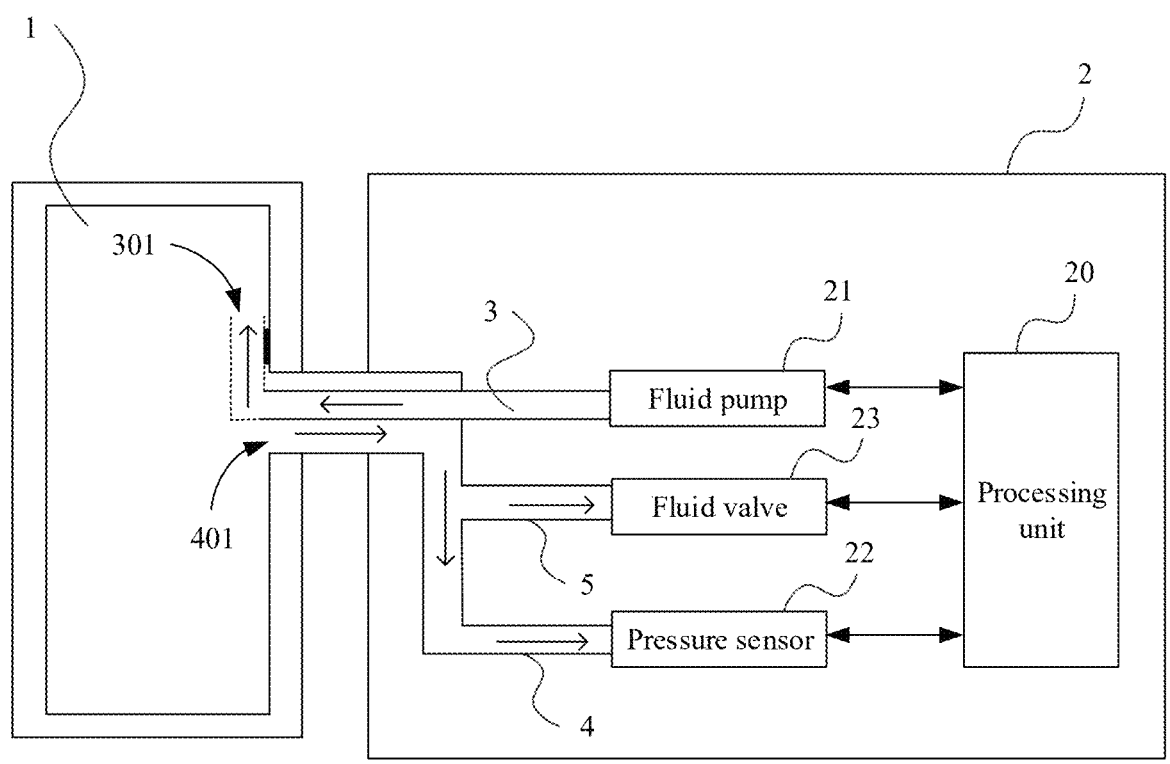
FIG. 8 is a schematic diagram of a flow status of fluid in FIG. 7 in a fluid channel.

For ease of understanding, the following describes in detail a fluid flow direction in the electronic device for measuring blood pressure shown in FIG. 7. FIG. 8 is a schematic diagram of a flow status of fluid in FIG. 7 in a fluid channel. As shown in FIG. 8, the fluid pump 21 drives fluid to flow along the first fluid pipeline 3 and enter the airbag 1 through the first nozzle 301. However, because there is high pressure in the airbag 1, the fluid in the airbag 1 flows into the second fluid pipeline 4 through the second nozzle 401 under pressure, and reaches the pressure sensor 22. In this way, the pressure sensor 22 can detect the pressure. When the airbag is deflated, a fluid valve 23 is opened, some pipe sections of the first fluid pipeline 3 serve as a pipeline through which fluid can flow out, and a flow direction of the fluid is opposite to that when the airbag 1 is inflated, so that the fluid flows out of the fluid valve 23 along the fluid pipeline.

Figure 9:
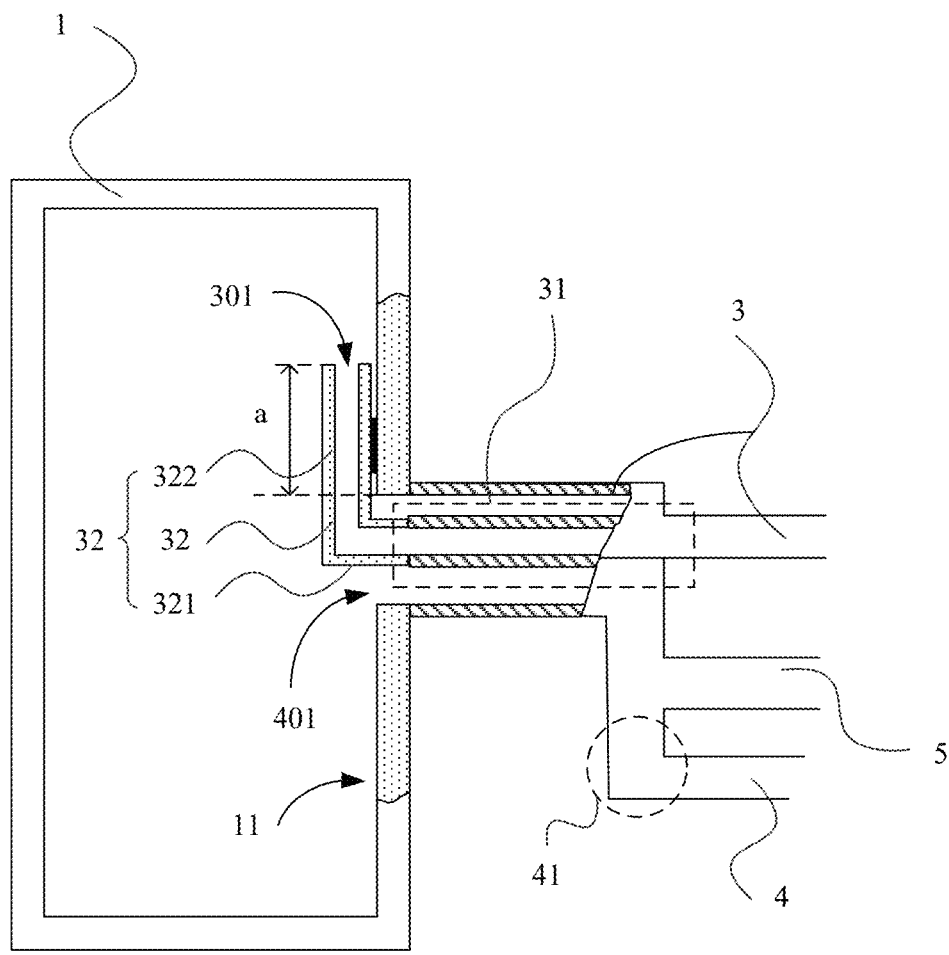
FIG. 9 is a schematic diagram of a specific structure of a junction region between a fluid pipeline and an airbag in the electronic device for measuring blood pressure in FIG. 7.
Figure 10:
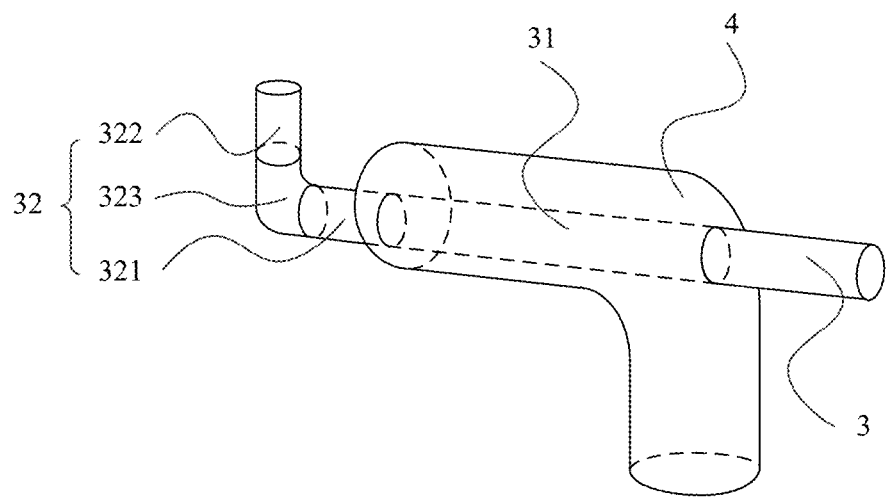
FIG. 10 is a schematic diagram of a nested structure of a first fluid pipeline and a second fluid pipeline in FIG. 7.

FIG. 9 is a schematic diagram of a specific structure of a junction region between the fluid pipeline and the airbag in the electronic device for measuring blood pressure in FIG. 7. FIG. 10 is a schematic diagram of a nested structure of the first fluid pipeline and the second fluid pipeline in FIG. 7. As shown in FIG. 9 and FIG. 10, a pipe section, of the first fluid pipeline 3, that is disposed inside the second fluid pipeline 4 may be defined as a first pipe section 31. It can be understood that there is a specific gap between the first pipe section 31 and a pipe section, of the second fluid pipeline 4, that is located at a periphery of the first pipe section 31, so that fluid can flow into the second fluid pipeline 4 through the gap. A shape of the gap between the first pipe section 31 and the peripheral pipe section may vary based on relative locations of the first pipe section 31 and the second fluid pipeline line 4. For example, there is a gap between a circumferential direction of the first pipe section 31 and an inner wall of the second fluid pipeline 4. In this way, an annular gap is formed between the first pipe section 31 and the second fluid pipeline 4, and air in the airbag 1 can enter the second fluid pipeline 4 through the annular gap and reach the pressure sensor 22.

In this way, some pipe sections of the first fluid pipeline 3 and the second fluid pipeline 4 are nested, so that the first fluid pipeline 3 and the second fluid pipeline 4 are connected to a same location on the airbag 1, in other words, the first fluid pipeline 3 and the second fluid pipeline 4 are connected to a same connection point on the airbag 1. Compared with a manner in which the first fluid pipeline 3 and the second fluid pipeline 4 are disposed side by side, a junction between the nested fluid pipelines and the airbag 1 occupies small space, so that the airbag 1 and the entire electronic device for measuring blood pressure have a more compact structure, thereby facilitating the electronic device for measuring blood pressure to be miniaturized and portable.

With respect to the first fluid pipeline 3, some pipe sections extend into the airbag 1 and are bent toward a side of the airbag 1. A pipe section, of the first fluid pipeline 3, that extends into the airbag 1 may be a second pipe section 32. The second pipe section 32 and the first pipe section 31 are sequentially connected, and the first nozzle 301 disposed away from the second nozzle 401 is formed at an end location of the second pipe section 32. In this case, the second pipe section 32 is a built-in pipe section of the first fluid pipeline 3. The first nozzle 301 may have a plurality of different locations relative to the inner wall of the airbag 1, for example, is close to and attached to the inner wall of the airbag 1, or has a large spacing from the inner wall of the airbag 1. In this embodiment, an example in which the first nozzle 301 is attached to the inner wall of the airbag 1 is used for description.

Specifically, as shown in FIG. 9, the second pipe section 32 that serves as a built-in pipe section includes a first extension section 321 and a second extension section 322 that extend into an inner side of the airbag 1. The first extension section 321 and the second extension section 322 are sequentially disposed along an air outlet direction. The first extension section 321 is connected to the first pipe section 31. The first nozzle 301 is located at an end of the second extension section 322, and the first extension section 321 and the second extension section 322 are connected through a first bent section 323. The first bent section 323 is bent toward a side of the airbag 1, for example, a side A in the figure, so that the opening direction of the first nozzle 301 is directly toward the side A. The airbag 1 may have a plurality of inner walls facing different directions, and an inner wall on a side, of the airbag 1, that is connected to the fluid pipeline may be defined as a first inner wall 11. The first extension section 321 is bent toward the side A immediately after it extends into the inner wall of the airbag 1. In this way, the second extension section 322 and the first nozzle 301 are both attached to the first inner wall 11, and can be supported by the first inner wall 11. When the electronic device for measuring blood pressure operates, fluid rushes out of the first nozzle 301 at a high speed. In this case, the second extension section 322 and the first nozzle 301 can be supported by the first inner wall 11. This prevents a phenomenon, for example, shaking, vibration, or even a change of an air outlet direction, from occurring on an extension part (the pipe section including the first extension section 321 and the second extension section 322), of the first fluid pipeline 3, that extends into the airbag 1 under impact of fluid such as airflow, thereby enhancing stability of the electronic device for measuring blood pressure during operating, and improving measurement accuracy. In addition, a person skilled in the art can understand that the first nozzle 301 may have different locations in the airbag 1 when the second extension section 322 has different extension lengths. For example, the first nozzle 301 may extend in a direction of the inner wall of the airbag 1, and be attached to an inner wall in another direction different from a direction of the first inner wall 11.

Figure 11:
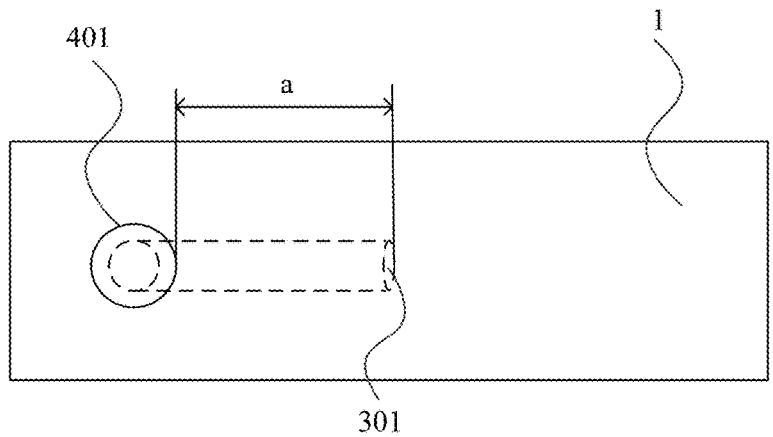
FIG. 11 is a schematic diagram of relative locations of a first nozzle and a second nozzle in the electronic device for measuring blood pressure in FIG. 7.

To reduce influence of the first nozzle 301 on the second nozzle 401, the first extension section 321 and the second extension section 322 may be kept at an angle of being perpendicular or approximately perpendicular. In this embodiment, the first extension section 321 and the second extension section 322 are perpendicular to each other. In this case, an extension direction of the first extension section 321 may be parallel to an extension direction of the first pipe section 31, in other words, parallel to the second fluid pipeline 4, and the second extension section 322 extends toward the side A perpendicular to the first extension section 321. It can be understood that an extension direction of the second extension section 322 is perpendicular to orientations of both the first extension section 321 and the second nozzle 401. FIG. 11 is a schematic diagram of relative locations of the first nozzle and the second nozzle in the electronic device for measuring blood pressure in FIG. 7. As shown in FIG. 11, in a length direction of the airbag 1, namely, a direction C, because the first nozzle 301 extends into the airbag 1 through the second pipe section 32, there is a specific spacing between the first nozzle 301 and the second nozzle 401. In this case, a length of the second extension section 322 may be approximately equal to the spacing between the first nozzle 301 and the second nozzle 401.

In the structure shown in FIG. 7 to FIG. 11, a second bent section 312 is connected to the first inner wall 11, so that the first nozzle 301 is supported by the first inner wall 11. Specifically, the second bent section 312 may be bonded to the first inner wall 11 by using a bonding agent 12, or fixed to the first inner wall 11 by using another fixing structure. An entire pipe section of the second bent section 312 may be fixed to the first inner wall 11, or the second bent section 312 may be fixed to the first inner wall 11 by using a plurality of fixing points disposed at intervals, provided that the second bent section 312 can be reliably and firmly fixed to the first inner wall 11, and that a phenomenon, for example, shaking or an orientation change does not occur when the first nozzle 301 is subject to impact of fluid.

When the first nozzle 301 is attached to the inner wall of the airbag 1, because the airbag 1 is made of a flexible material, to prevent the first fluid pipeline 3 from interfering with normal deformation of the airbag 1, in an optional manner, the extension section, of the first fluid pipeline 3, that extends into the airbag 1, namely, the second pipe section 32, may be a flexible pipe section capable of elastic deformation (for example, a dashed line in FIG. 6 indicates a boundary of a pipe wall). In this way, the second extension section 322 and the first nozzle 301 can move and deform accordingly with expansion or contraction of the airbag 1, without detaching from the first inner wall 11 of the airbag 1. In addition, the first fluid pipeline 3 may expand or collapse accordingly with deformation of the airbag 1, without forming a rigid protrusion in the airbag 1, thereby ensuring a comfortable wearing for a testee.

The second pipe section 32 may be made of a plurality of different flexible materials. For example, the second pipe section 32 may be an emulsion pipe or a rubber pipe. This is not limited herein.

When the first fluid pipeline 3 and the second fluid pipeline 4 are nested, to prevent the first fluid pipeline 3 and the second fluid pipeline 4 from affecting each other under internal fluid pressure, optionally, the first pipe section 31 of the first fluid pipeline 3 and a pipe section, of the second fluid pipeline 4, that is located outside the airbag may be rigid pipe sections that are not easily deformed. In this way, even if there is large airflow impact in the first fluid pipeline 3, a pipe wall of the first fluid pipeline 3 can maintain an original shape, so that the second fluid pipeline 4 has a stable state. This avoids a pressure change phenomenon when fluid in the second fluid pipeline 4 is subject to an acting force of the first fluid pipeline 3 or an external environment, thereby improving detection accuracy of the pressure sensor, and facilitating correct measurement and display of a blood pressure value. In addition, pipe sections, of the first fluid pipeline 3 and the second fluid pipeline 4, that are located outside the airbag 1 are rigid pipe sections, thereby helping maintain pipe connection between the measurement assembly 2 and the airbag 1, and improving structural strength of the electronic device for measuring blood pressure.

A person skilled in the art can understand that, the pipe sections, of the first fluid pipeline 3 and the second fluid pipeline 4, that are located outside the airbag 1 can have a specific elastic strain capability while ensuring a stable state in the fluid pipelines. In this case, these pipe sections of the first fluid pipeline 3 and the second fluid pipeline 4 can have both good supporting performance and a specific elastic deformation capability, to absorb some energy of airflow impact during operating, so that the airflow pipelines have a stable operating state during operating, thereby ensuring normal operating of the electronic device for measuring blood pressure. Optionally, the pipe sections, of the first fluid pipeline 3 and the second fluid pipeline 4, that are located outside the airbag 1 may be made of framework rubber or another flexible material with a specific supporting capability.

To buffer airflow that enters the second fluid pipeline 4 and reduce interference of airflow impact on the pressure sensor, there may also be a structure for buffering airflow in the second fluid pipeline 4. In an optional implementation, the second fluid pipeline 4 may have at least one second bent section 41.

Specifically, because the second fluid pipeline 4 has the second bent section 41, there is an included angle between a pipe section of the second fluid pipeline 4 that is located before the second bent section 41 and a pipe section of the second fluid pipeline 4 that is located after the second bent section 41. In a process in which airflow passes through the second fluid pipeline 4, when the airflow encounters the second bent section 41, the airflow collides with the pipe wall of the second bent section 41, and impact energy of the airflow is consumed, thereby reducing impact when the airflow reaches the pressure sensor.

To achieve a good buffering effect, the second bent section 41 may have a large bending angle. Optionally, the bending angle of the second bent section 41 may be kept at approximately 90 degrees. To be specific, the pipe section located before the second bent section 41 and the pipe section located after the second bent section 41 are perpendicular to each other. In this way, when airflow passes through the second bent section 41, a direction of the airflow changes greatly, so that impact of the airflow can be well buffered and attenuated.

Optionally, there may be one or more second bent sections 41. When there are a plurality of second bent sections 41, a direction of air may change multiple times through a plurality of different second bent sections 41 after the air enters the second fluid pipeline 4, to consume impact energy of the air multiple times, thereby achieving a good buffering effect.

In addition, in a detection process of the electronic device for measuring blood pressure, the airbag 1 is slowly deflated after being inflated and pressing against a limb of a testee, so that the pressure sensor detects pressure fluctuation caused by air pressure impact in the process. To implement a deflation operation on the airbag 1, the electronic device for measuring blood pressure includes the fluid valve 23 for deflation, and correspondingly, the fluid pipelines include a third fluid pipeline 5 connected between the fluid valve 23 and the airbag 1. When the airbag 1 needs to be deflated, the fluid valve 23 may be opened, so that air in the airbag 1 flows out through the third fluid pipeline 5 and the fluid valve 23. In this embodiment, to control the fluid valve 23, the fluid valve 23 may be an electromagnetic valve, and the fluid valve 23 is electrically connected to the processing unit in the electronic device for measuring blood pressure, so that opening or closing of the fluid valve is controlled by a control instruction of the processing unit.

The third fluid pipeline 5 also has a structure similar to that of the other fluid pipelines. For example, in an optional implementation, the third fluid pipeline 5 may be connected to the airbag 1 through a third nozzle.

When the electronic device for measuring blood pressure performs a deflation operation on the airbag 1, airflow in the third fluid pipeline 5 is slow, and an airflow velocity is low. Therefore, the airflow in the third fluid pipeline 5 has small influence on detection accuracy of the pressure sensor, and a disposing manner and a structure of the third fluid pipeline 5 are also less limited. In this case, in an optional manner, the third nozzle and the second nozzle 401 may have similar structures. Specifically, similar to the second nozzle 401, the third nozzle may also extend to a location at which the third nozzle is connected to the inner wall of the airbag 1, for example, on the first inner wall 11. In this case, an edge of the third nozzle may be flush with the first inner wall 11.

In addition, because the airflow in the third fluid pipeline 5 has small influence, in another optional manner, the third fluid pipeline 5 may alternatively share some pipelines with another fluid pipeline. For example, the third fluid pipeline 5 may share a pipeline with the first fluid pipeline 3 or the second fluid pipeline 4. In this embodiment, because the first nozzle 301 and some pipe sections of the first fluid pipeline 3 are made of a flexible material, when the fluid pump 21 connected to the first fluid pipeline 3 is not operating, the first nozzle 301 and a pipe section connected to the first nozzle 301 may collapse, thereby hindering air in the airbag from entering the first fluid pipeline 3. Therefore, to enable the third fluid pipeline 5 to perform ventilation normally, this embodiment is described by using an example in which the third fluid pipeline 5 and the second fluid pipeline 4 share some pipe sections, for example, a pipe section, of the second fluid pipeline 4, that is connected to the airbag 1. In this case, the third fluid pipeline 5 and the second fluid pipeline 4 are connected to the fluid valve 23 and the fluid pump 21 respectively. In addition, the third fluid pipeline 5 and the second fluid pipeline 4 are combined into one pipe section in a process of extending toward the airbag 1, and the pipe section is connected to the airbag 1 through the first nozzle 301.

In this case, because the third fluid pipeline 5 and the second fluid pipeline 4 are both connected to the airbag 1 through the second nozzle 401, a junction between the fluid pipelines and the airbag 1 occupies small space, so that limited surface space of the airbag 1 can be effectively utilized, thereby facilitating miniaturization and compaction of the airbag and the entire electronic device for measuring blood pressure.

In an optional implementation, a pipe section, of the third fluid pipeline 5, that is located outside the airbag 1 may be a rigid pipe section that is not easily deformed. A material of the third fluid pipeline 5 may be framework rubber or another flexible material with a specific supporting capability.

In this embodiment, the electronic device for measuring blood pressure specifically includes the airbag and the measurement assembly. The measurement assembly includes the processing unit, the fluid pump, and the pressure sensor. The fluid pump and the sensor are both electrically connected to the processing unit. Fluid pipelines include the first fluid pipeline connected between the fluid pump and the airbag, and the second fluid pipeline connected between the pressure sensor and the airbag. The first fluid pipeline has the first nozzle connected to the airbag, and the second fluid pipeline has the second nozzle connected to the airbag. An opening direction of one of the first nozzle and the second nozzle is away from that of the other, so that the first nozzle and the second nozzle are away from each other. In this way, when the fluid pump in the electronic device for measuring blood pressure supplies fluid to the airbag, fluid that rushes out of the first nozzle flows in a direction away from the second nozzle, and there is a specific spacing between the first nozzle and the second nozzle, so that the second nozzle is not subject to direct impact of the fluid, and is subject to small impact and influence. This can prevent impact of the fluid from affecting detection by the pressure sensor, and achieve high blood pressure measurement accuracy.

Scenario 2

Figure 12:
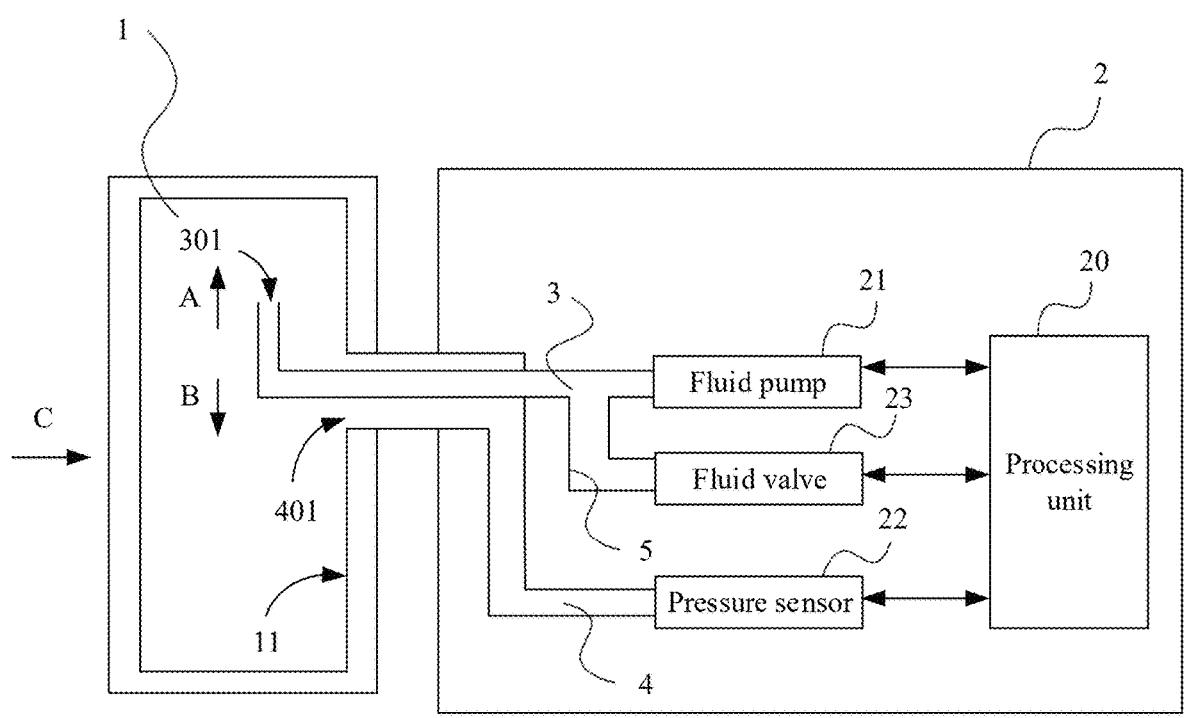
FIG. 12 is a schematic diagram of a structure of another electronic device for measuring blood pressure according to an embodiment of this application.

In an electronic device for measuring blood pressure, a spacing between a first nozzle and a second nozzle may be increased to reduce influence of airflow on a pressure sensor. For example, in addition to the manner of attaching the first nozzle to the inner wall of the airbag in the foregoing embodiment, the first nozzle may be alternatively extended to a location with a specific spacing from the inner wall of the airbag. FIG. 12 is a schematic diagram of a structure of another electronic device for measuring blood pressure according to an embodiment of this application. As shown in FIG. 12, an overall structure, a function, and an operating principle of the electronic device 200 for measuring blood pressure that is provided in this scenario are similar to those of the electronic device for measuring blood pressure in the foregoing scenario. Details are not described herein again. A difference lies in that, in the electronic device 200 for measuring blood pressure in this scenario, a second nozzle 401 of a second fluid pipeline 4 is at a location flush with an inner wall of an airbag 1. In a part, of the first fluid pipeline 3, that extends into the airbag 1, a location at which bending and a direction change occur has a specific spacing from the inner wall of the airbag 1, so that there is a specific spacing between a first nozzle 301 and the inner wall of the airbag 1.

It should be noted that, in this scenario, a manner of nesting the first fluid pipeline 3 and the second fluid pipeline 4 is used. For a specific structure and nesting manner of the first fluid pipeline 3 and the second fluid pipeline 4, refer to the descriptions in the scenario 1.

In the second fluid pipeline 4 of the electronic device 200 for measuring blood pressure, the second nozzle 401 does not extend into the airbag 1, but is flush with the inner wall of the airbag 1. For example, an edge of the second nozzle 401 may be flush with a first inner wall 11 of the airbag 1. In this case, if the first nozzle 301 is also attached to the first inner wall 11 of the airbag 1, although an opening direction of the first nozzle 301 is away from the second nozzle 401, there is a small spacing between the first nozzle 301 and the second nozzle 401. Therefore, there can be a specific spacing between the first nozzle 301 and an inner wall of the airbag 1 on this side, namely, the first inner wall 11, to increase a distance between the first nozzle 301 and the second nozzle 401.

Figure 13:
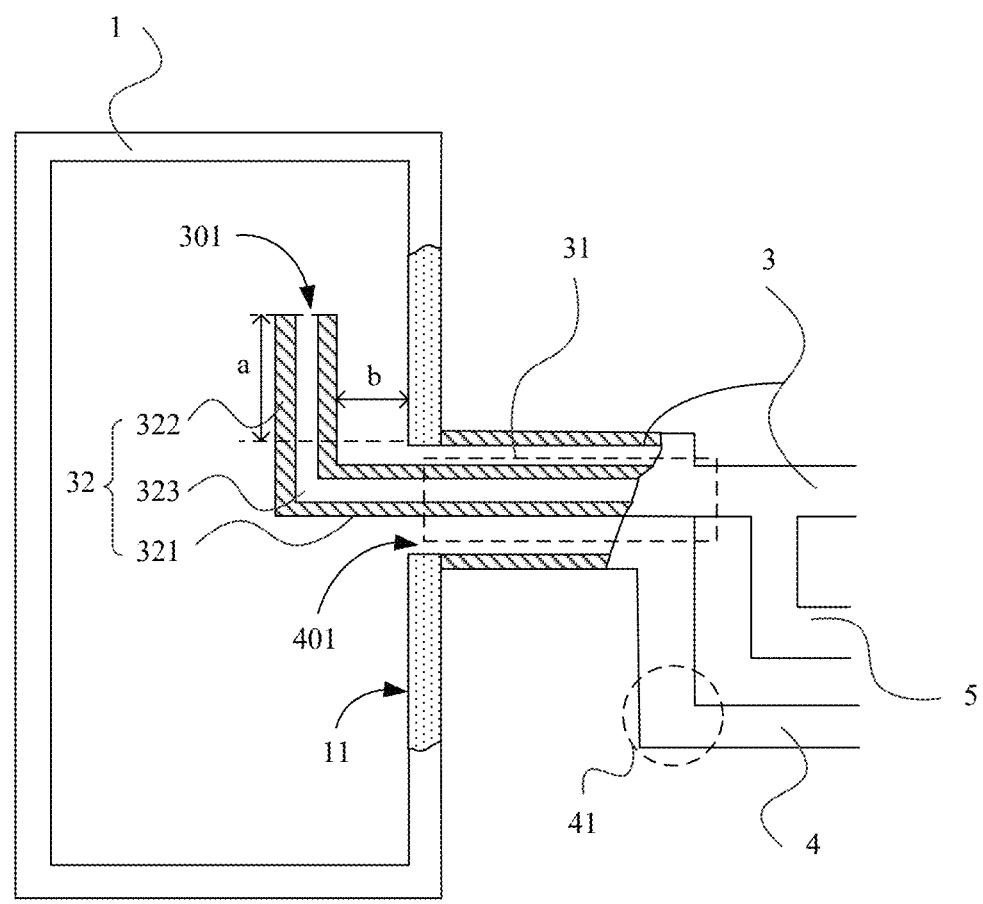
FIG. 13 is a schematic diagram of a specific structure of a junction region between a fluid pipeline and an airbag in the electronic device for measuring blood pressure in FIG. 12.

FIG. 13 is a schematic diagram of a specific structure of a junction region between the fluid pipeline and the airbag in the electronic device for measuring blood pressure in FIG. 12. As shown in FIG. 13, with respect to the first fluid pipeline 3, a first pipe section 31 of the first fluid pipeline 3 is nested in the second fluid pipeline 4, and a built-in pipe section, of the first fluid pipeline 3, that extends into the airbag 1 may be a second pipe section 32. The second pipe section 32 has a first extension section 321 and a second extension section 322 that are sequentially connected along an air outlet direction, the first nozzle 301 is located at an end of the second extension section 322, and the first extension section 321 and the second extension section 322 are connected through a first bent section 323. In the second pipe section 32, after extending into the airbag 1, the first extension section 321 continues to extend to a location with a specific spacing from the first inner wall 11 of the airbag 1, and the first bent section 323 located between the first extension section 321 and the second extension section 322 also has a spacing from the inner wall of the airbag 1. In this case, the second extension section 322 connected to the first bent section 323 and the first nozzle 301 located at the end of the second extension section 322 each has a corresponding spacing from the first inner wall 11 of the airbag 1. In this case, because the second nozzle 401 is disposed on the inner wall of the airbag 1, there may be a specific spacing between the first nozzle 301 and the second nozzle 401, and the spacing between the first nozzle 301 and the second nozzle 401 may be determined by a length and a direction of each part of the second pipe section 32. Specifically, compared with the scenario 1, the spacing between the first nozzle 301 and the second nozzle 401 is determined by a length a of the second extension section 322, and by a length b of the first extension section 321.

Optionally, the first extension section 321 may extend to a central region in the airbag 1. In this case, the first bent section 323 in the second pipe section 32 has a specific spacing from an inner wall in each direction in the airbag 1. In this way, airflow that rushes out of the first nozzle 301 causes small impact on the inner wall of the airbag 1. Therefore, the second nozzle 401 located on the inner wall of the airbag 1 is also subject to small impact, thereby helping improve measurement accuracy.

For example, in this embodiment, the first extension section 321 and the second fluid pipeline 4 may be parallel or approximately parallel to each other, and a roughly right bending angle is formed between the second extension section 322 and the first extension section 321. In this case, an approximately right-angled triangle may be formed between the first nozzle 301, the second nozzle 401, and the first bent section 323, and the spacing between the first nozzle 301 and the second nozzle 401 is greater than a length of each separate pipe section in the second pipe section 32.

In addition, the first extension section 321 and the second extension section 322 may be alternatively oriented in other different directions. For example, the second extension section 322 may extend in a direction away from the first inner wall 11, to increase a spacing between the first nozzle 301 and the first inner wall 11. A person skilled in the art can understand that a bending angle between the first extension section 321 and the second extension section 322 is greater than or equal to 90 degrees, so that there is a large spacing between the first nozzle 301 and the second nozzle 401.

To ensure that there is always a specific spacing between the first nozzle 301 of the first fluid pipeline 3 and the inner wall of the airbag 1, in an optional manner, the second pipe section 32 of the first fluid pipeline 3 may be a rigid pipeline.

Specifically, the airbag 1 is made of a retractable material, and the second pipe section 32 may be made of framework rubber or another material with a specific supporting capability. In this case, the airbag 1 can contract or expand with a change of air pressure, and the second pipe section 32 has specific rigidity. After extending to the inner wall of the airbag 1, the second pipe section 32 can maintain the form, and keep a specific spacing from the inner wall of the airbag 1, without being attached to the inner wall of the airbag 1 due to bending or flexible collapsing of the second pipe section 32.

To simplify a manufacturing process of the first fluid pipeline 3, optionally, the entire first fluid pipeline 3 including the second pipe section 32 and the first pipe section 31 may be made of framework rubber or another same material with similar characteristics, specifically as shown in FIG. 12. In this way, the first fluid pipeline 3 can be uniformly manufactured and molded, thereby reducing difficulty of assembly and manufacturing.

In addition, optionally, the entire second fluid pipeline 4 may also be made of framework rubber or another similar material, so that the first fluid pipeline 3 and the second fluid pipeline 4 are both manufactured by using a same process, a manufacturing process is simple, and costs are low.

When fluid pipelines include a third fluid pipeline 5 connected between a fluid valve 23 and the airbag 1, in an optional manner, the third fluid pipeline 5 may alternatively share some pipelines with another fluid pipeline, for example, shares a pipeline with the first fluid pipeline 3 or the second fluid pipeline 4. For example, to reduce influence of the fluid valve 23 on a pressure sensor 22, this embodiment is described by using an example in which the third fluid pipeline 5 and the first fluid pipeline 3 share some pipe sections, for example, a pipe section, of the first fluid pipeline 3, that is connected to the airbag 1. In this case, the third fluid pipeline 5 and the first fluid pipeline 3 are connected to the fluid valve 23 and the fluid pump 21 respectively. In addition, the third fluid pipeline 5 and the first fluid pipeline 3 are combined into one pipe section in a process of extending toward the airbag 1, and the pipe section is connected to the airbag 1 through the first nozzle 301. Because the first fluid pipeline 3 is constituted by a rigid pipe section and is not subject to a phenomenon that hinders ventilation, for example, collapsing, normal ventilation of the third fluid pipeline 5 can be ensured. In addition, because the third fluid pipeline 5 and the first fluid pipeline 3 are both connected to the airbag 1 through the first nozzle 301, a junction between the fluid pipelines and the airbag 1 occupies small space, so that limited surface space of the airbag 1 can be effectively utilized, thereby facilitating miniaturization and compaction of the airbag and the entire electronic device for measuring blood pressure.

In this embodiment, the electronic device for measuring blood pressure includes components such as a measurement assembly, the airbag, and the fluid pipelines, and an orientation of the first nozzle of the first fluid pipeline is away from an orientation of the second nozzle of the second fluid pipeline. In a part, of the first fluid pipeline, that extends into the airbag, a location at which bending and a direction change occur has a specific spacing from the inner wall of the airbag, so that there is a specific spacing between the first nozzle and the inner wall of the airbag. In this way, airflow that rushes out of the first nozzle causes small impact on the inner wall of the airbag. Therefore, the second nozzle located on the inner wall of the airbag is also subject to small impact, thereby helping improve measurement accuracy.

Scenario 3

Figure 14:
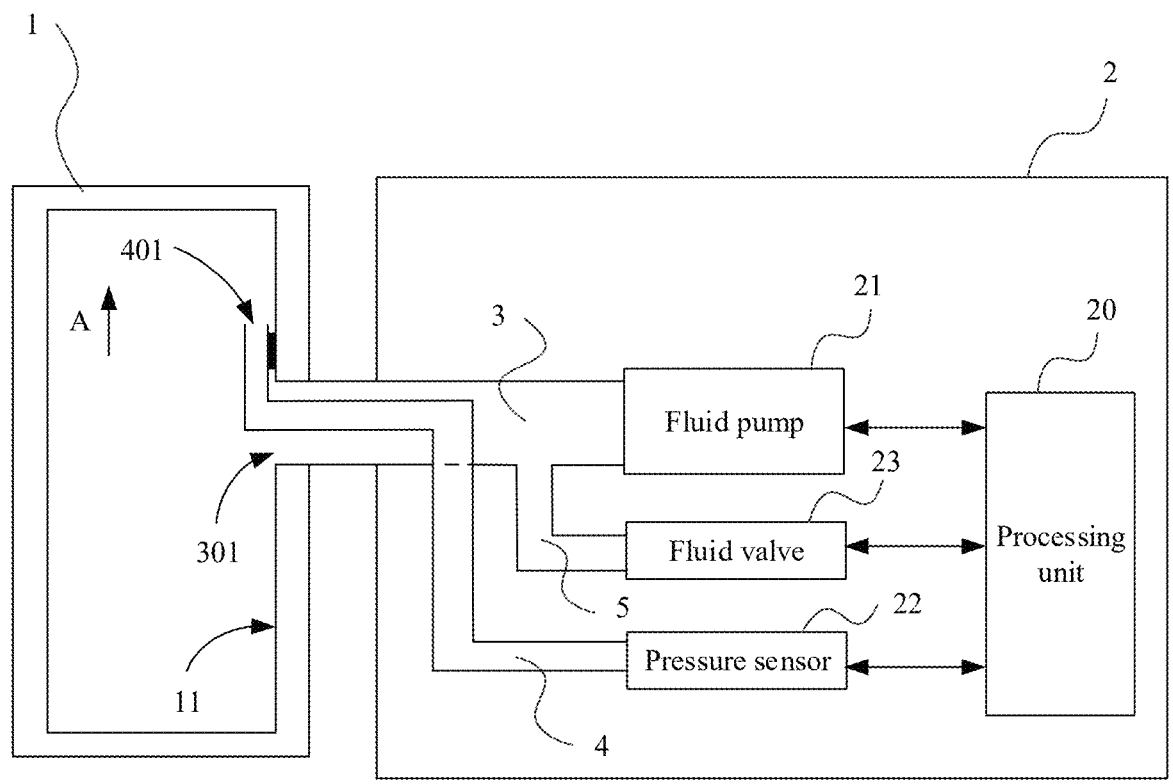
FIG. 14 is a schematic diagram of a structure of a third electronic device for measuring blood pressure according to an embodiment of this application.

To reduce influence of airflow of a fluid pump on a pressure sensor, a second fluid pipeline may alternatively extend into an airbag in addition to a manner in which a first fluid pipeline extends into the airbag. FIG. 14 is a schematic diagram of a structure of a third electronic device for measuring blood pressure according to an embodiment of this application. As shown in FIG. 14, an overall structure, a function, and an operating principle of the electronic device 400 for measuring blood pressure that is provided in this scenario are similar to those in the foregoing embodiment. Details are not described herein again. A difference from the scenario in the foregoing embodiment lies in that, in this scenario, a second fluid pipeline 4 may have some pipe sections that extend into an airbag 1, and a first fluid pipeline 3 does not extend into the airbag 1.

Specifically, a pipe section of the first fluid pipeline 3 is only connected to the airbag 1, but does not extend into the airbag 1. In this way, a first nozzle 301 of the first fluid pipeline 3 extends to a location at which the first nozzle 301 is connected to an inner wall of the airbag 1. In this case, an opening direction of the first nozzle 301 is toward inside of the airbag 1. To keep the first nozzle 30 and a second nozzle 401 of the second fluid pipeline 4 away from each other, correspondingly, an opening direction of the second nozzle 401 may be away from the first nozzle 301.

In this scenario, the disposing manner in which the first nozzle 301 and the second nozzle 401 are nested may also be used. In this way, the first nozzle 301 and the second nozzle 401 are connected to a same part of the airbag 1, to effectively utilize limited space of the airbag 1, thereby reducing a volume of the airbag 1 and the entire electronic device 400 for measuring blood pressure, and facilitating the electronic device 400 for measuring blood pressure to be miniaturized and portable.

Figure 15:
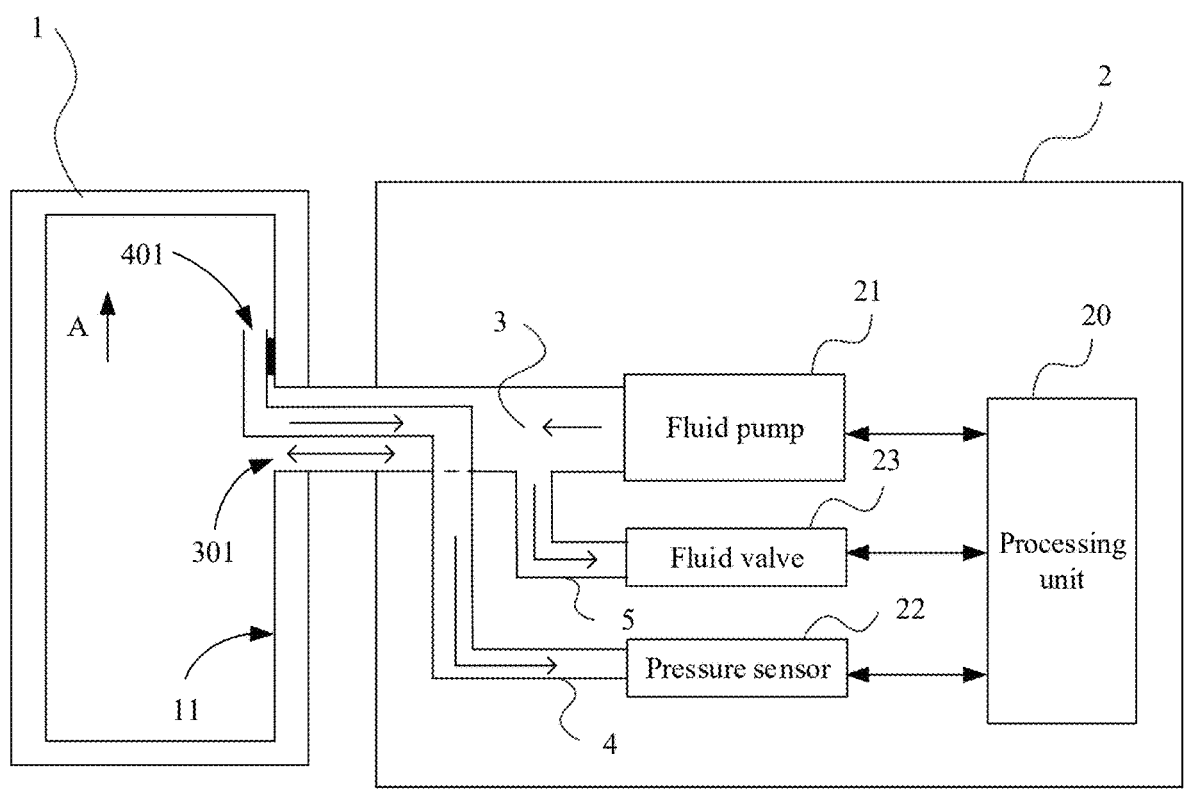
FIG. 15 is a schematic diagram of a flow status of fluid in FIG. 14 in a fluid channel.

Specifically, the following disposing manner may be used: The second nozzle 401 is disposed on an inner side of the first nozzle 301, and there is a spacing between an outer wall of the second nozzle 401 and an inner wall of the first nozzle 301. In this case, one end of the second fluid pipeline 4 may extend into the airbag through the first nozzle 301, and constitute the second nozzle 401 and a part, of the second fluid pipeline 4, that extends in the airbag 1; and the other end of the second fluid pipeline 4 penetrates a pipe wall of the first fluid pipeline 3, and is connected to a pressure sensor 22. For ease of understanding, the following describes in detail a fluid flow direction in FIG. 14. FIG. 15 is a schematic diagram of a flow status of fluid in FIG. 14 in a fluid channel. As shown in FIG. 15, similar to the foregoing scenario, the fluid pump 21 drives fluid to flow along the first fluid pipeline 3 and enter the airbag 1 through the first nozzle 301. However, because there is high pressure in the airbag 1, the fluid in the airbag 1 flows into the second fluid pipeline 4 through the second nozzle 401 under an action of pressure, and reaches the pressure sensor 22. In this way, the pressure sensor 22 can detect the pressure. When the airbag is deflated, a fluid valve 23 is opened. In this case, some pipe sections of the first fluid pipeline 3 serve as an outflow pipeline, and a flow direction of fluid is opposite to that when the airbag is inflated, so that the fluid flows out of the fluid valve 23 along the fluid pipeline.

Figure 16:
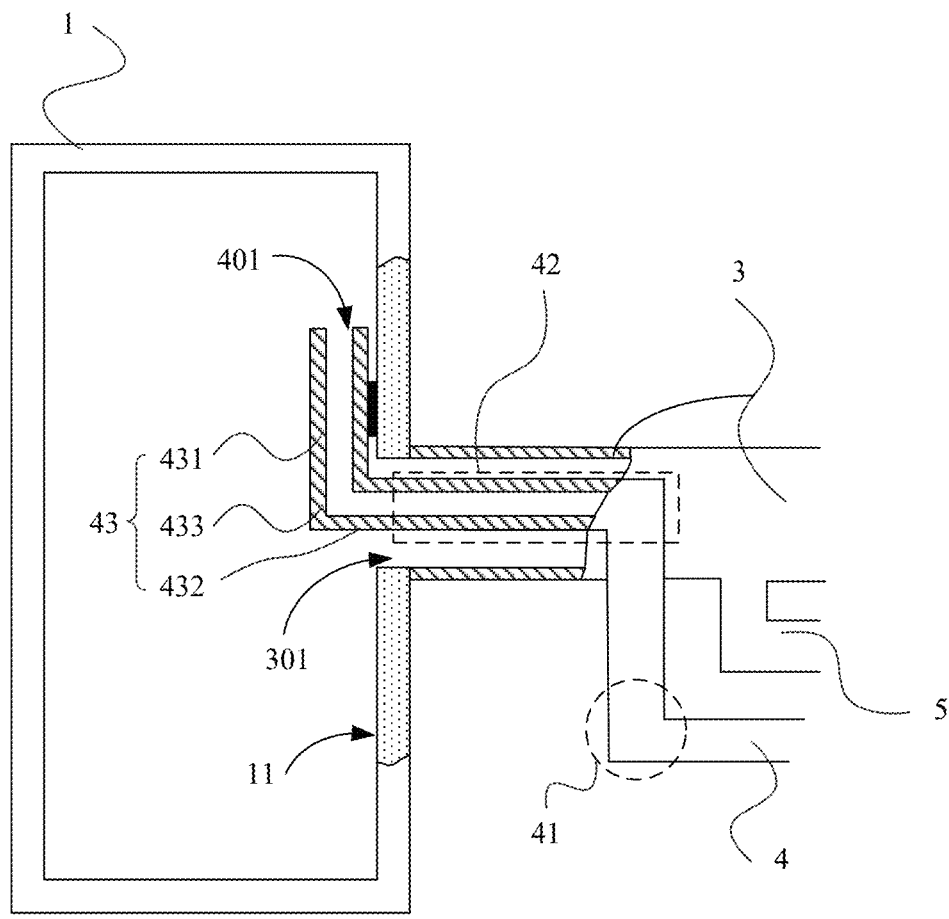
FIG. 16 is a schematic diagram of a specific structure of a junction region between a fluid pipeline and an airbag in the electronic device for measuring blood pressure in FIG. 14.

FIG. 16 is a schematic diagram of a specific structure of a junction region between the fluid pipeline and the airbag in the electronic device for measuring blood pressure in FIG. 14. As shown in FIG. 14 to FIG. 16, some pipe sections of the second fluid pipeline 4 are nested with the first fluid pipeline 3, and a pipe section, of the second fluid pipeline 4, that is surrounded by the first fluid pipeline 3 may be defined as a third pipe section 42. With respect to the second fluid pipeline 4, some pipe sections extend into the airbag 1 and are bent toward a side of the airbag 1. A built-in pipe section, of the second fluid pipeline 4, that extends into the airbag 1 may be a fourth pipe section 43. The fourth pipe section 43 and the third pipe section 42 are sequentially connected.

In an optional implementation, the fourth pipe section 43 that serves as a built-in pipe section may include a third extension section 431 and a fourth extension section 432. The third extension section 431 and the fourth extension section 432 are sequentially disposed along a flow direction of airflow in the second fluid pipeline 4. The third extension section 431 and the fourth extension section 432 are connected through a third bent section 433.

As shown in FIG. 16, the second nozzle 401 is located at an end of the third extension section 431, and an end, of the third extension section 431, that is away from the second nozzle 401 is connected to the fourth extension section 432 through the third bent section 433. Similar to the scenario 1, the third bent section 433 is bent toward a side of the airbag 1, for example, a side A, so that an opening direction of the first nozzle 301 is toward the side A. The airbag 1 may have a plurality of inner walls facing different directions, and an inner wall on a side, of the airbag 1, that is connected to the fluid pipeline may be defined as a first inner wall 11. After extending to the inner wall of the airbag 1, the fourth extension section 432 is bent toward the side A. In this way, the opening direction of the second nozzle 401 can be different from that of the first nozzle 301. There may be a plurality of different relative locations between the second nozzle 401 and the inner wall of the airbag 1. For example, in an optional implementation, as shown in FIG. 13 and FIG. 14, the third extension section 431 and the second nozzle 401 may be both attached to the first inner wall 11 and supported by the first inner wall 11. In this case, the second nozzle 401 may be well fixed and located by using the inner wall of the airbag 1, to prevent the second nozzle 401 from causing a problem that affects detection accuracy, for example, shaking. Optionally, the third extension section 431 may be fixed to the first inner wall 11 by using a bonding agent 13 or the like.

In addition, to increase a distance between the second nozzle 401 and the first nozzle 301, in another optional manner, there may be alternatively a specific spacing between the second nozzle 401 and the first inner wall 11. When there is a spacing between the second nozzle 401 and the first inner wall 11 and the first nozzle 301 is at a location flush with the first inner wall 11, there is a large distance between the second nozzle 401 and the first nozzle 301, so that a velocity of airflow that rushes out of the first nozzle 301 decreases when the airflow reaches the location of the second nozzle 401. This prevents impact of the airflow from affecting normal detection by the pressure sensor, and ensures measurement accuracy. In this case, a specific structure of the third extension section 431, the fourth extension section 432, and the second nozzle 401 in the second fluid pipeline 4 may be similar to the structure of the first fluid pipeline 3 in the scenario 2. Details are not described herein again.

This embodiment is described by using an example in which the third extension section 431 and the second nozzle 401 are both attached to the first inner wall 11. To reduce influence of the first nozzle 301 on the second nozzle 401, the third extension section 431 and the fourth extension section 432 may be kept at an angle of being perpendicular or approximately perpendicular. In this embodiment, the third extension section 431 and the fourth extension section 432 are perpendicular to each other. In this case, an extension direction of the fourth extension section 432 may be parallel to an extension direction of the first nozzle 301, and the third extension section 431 extends in a direction perpendicular to the fourth extension section 432, and is roughly perpendicular to the first nozzle 301.

Because the second fluid pipeline 4 connected to the second nozzle 401 is connected to the pressure sensor, in an optional implementation, a location of the second nozzle 401 in the airbag 1 may correspond to a location of an artery of a testee.

Specifically, when the airbag 1 is bound to a limb of the testee, an artery on the limb of the testee is close to and attached to a part of the airbag. When the second nozzle 401 is located at the part in the airbag 1, because the artery is close to the second nozzle 401, an air pressure change at the second nozzle 401 responds to blood impact in the artery in a timely manner, and detection by the pressure sensor is fast and direct. In addition, the pressure change at the second nozzle 401 is less affected by other parts of the airbag 1, thereby improving detection accuracy. In this way, the second nozzle 401 may collect an airbag pressure change status at a location near the artery, so that detection by the pressure sensor has a high response speed and high accuracy.

Figure 17:
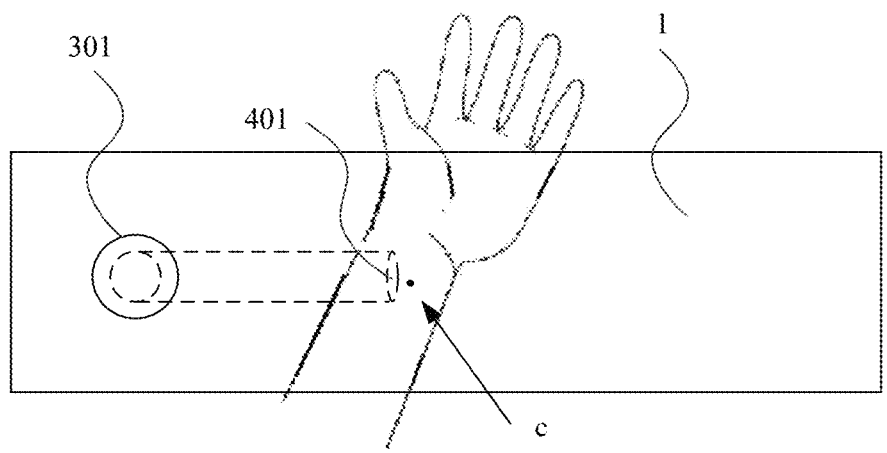
FIG. 17 is a schematic diagram of a location of a second nozzle during measurement by the electronic device for measuring blood pressure in FIG. 14.

FIG. 17 is a schematic diagram of a location of the second nozzle during measurement by the electronic device for measuring blood pressure in FIG. 14. As shown in FIG. 17, specifically, when the electronic device 300 for measuring blood pressure is disposed on a wrist of a testee, a location of the second nozzle 401 on the airbag 1 may correspond to a location of a radial artery c of the testee. In this case, the airbag 1 may surround the wrist of the testee, and after extending into the airbag 1, the second fluid pipeline 4 may extend along a circumferential direction (which may be a length direction of the airbag) surrounding the wrist, so that the second nozzle 401 is located at or close to the radial artery c of the testee.

In addition, to enable the second fluid pipeline 4 to buffer airflow impact, in an optional manner, a part, of the second fluid pipeline 4, that is located outside the airbag 1 may also have a second bent section 41. Because there are nested pipe sections between the second fluid pipeline 4 and the first fluid pipeline 3, the second bent section 41 of the second fluid pipeline 4 is located beyond the nested pipe sections to avoid mutual interference between the two fluid pipelines. Specifically, the second bent section 41 of the second fluid pipeline 4 may be located between the third pipe section 42 and the pressure sensor 22. There is an included angle between a pipe section of the second fluid pipeline 4 that is located before the second bent section 41 and a pipe section of the second fluid pipeline 4 that is located after the second bent section 41, so that airflow passing through the second bent section 41 collides with a pipe wall of the second fluid pipeline 4, thereby consuming energy of the airflow and reducing impact.

In addition, the second nozzle 401 is mainly used for air in the airbag 1 to enter the second fluid pipeline 4, and the second nozzle 401 itself does not produce airflow. During deflation and contraction of the airbag 1, inner space of the airbag 1 is continuously reduced. In this case, if the fourth pipe section 43, of the second fluid pipeline 4, that is located in the airbag 1 does not have a sufficient supporting capability, the second nozzle 401 may be deformed under pressing by the airbag 1, and a cross-sectional area of the second nozzle 401 is reduced accordingly. In this case, normal airflow in the second fluid pipeline 4 and the airbag 1 is interfered with, and normal detection by the pressure sensor is further affected.

To prevent deformation of the airbag 1 from affecting normal ventilation of the second nozzle 401, in an optional manner, the fourth pipe section 43, of the second fluid pipeline 4, that is located in the airbag 1 is a rigid pipeline. In this way, even if the airbag 1 presses against the second fluid pipeline 4 due to reduction of inner space, the fourth pipe section 43 and the second nozzle 401 still retain original shapes and cross-sectional areas, thereby maintaining normal airflow in the second fluid pipeline 4. Specifically, an extension section, of the second fluid pipeline 4, that is located in the airbag 1 may be made of framework rubber or another deformation-resistant material commonly used by a person skilled in the art. This is not limited herein.

In addition, similar to the foregoing scenario, to perform a deflation operation on the airbag 1, the electronic device 400 for measuring blood pressure further includes the fluid valve 23 and a third fluid pipeline 5 connected between the fluid valve 23 and the airbag 1. Various possible implementation forms and structures of the third fluid pipeline 5 are similar to those of the third fluid pipeline in the foregoing embodiment. Details are not described herein again.

To reduce a quantity of connection points between the fluid pipelines and the airbag 1, the third fluid pipeline 5 may share some pipe sections with another fluid pipeline. In this embodiment, in an optional manner, a first end of the third fluid pipeline 5 may be connected to the first fluid pipeline 3, so that the third fluid pipeline 5 and the first fluid pipeline 3 share some pipe sections and are both connected to the airbag through the first nozzle 301; and a second end of the third fluid pipeline 5 is connected to the fluid valve 23. Because the third fluid pipeline 5 and the first fluid pipeline 3 are both connected to the airbag 1 through the first nozzle 301, a junction between the fluid pipelines and the airbag 1 occupies small space, so that limited surface space of the airbag 1 can be effectively utilized, thereby facilitating miniaturization and compaction of the airbag 1 and the entire electronic device 300 for measuring blood pressure. In addition, airflow in the third fluid pipeline 5 does not interfere with the second fluid pipeline 2, and therefore has small impact on detection by the pressure sensor 22.

In this embodiment, the electronic device for measuring blood pressure includes components such as a measurement assembly, the airbag, and the fluid pipelines, and orientations of the first nozzle and the second nozzle in the fluid pipelines are away from each other. Some pipe sections of the second fluid pipeline are nested in the first fluid pipeline, and some pipe sections of the second fluid pipeline extend into the airbag and are bent toward a side of the airbag. In this way, when the fluid pump in the electronic device for measuring blood pressure supplies fluid to the airbag, fluid that rushes out of the first nozzle flows in a direction away from the second nozzle, and there is a specific spacing between the first nozzle and the second nozzle, so that the second nozzle is not subject to direct impact of the fluid, and is subject to small impact and influence. This can prevent impact of the fluid from affecting detection by the pressure sensor, and achieve high blood pressure measurement accuracy.

Scenario 4

Figure 18:
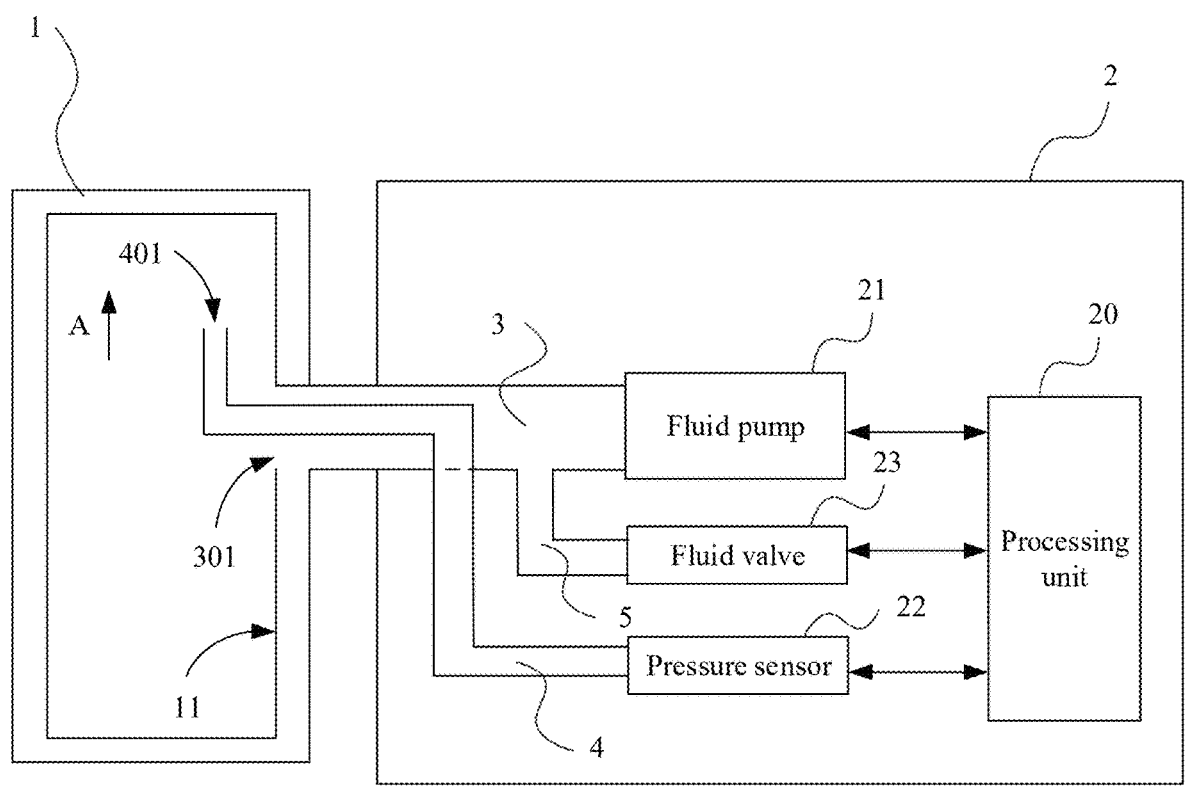
FIG. 18 is a schematic diagram of a structure of a fourth electronic device for measuring blood pressure according to an embodiment of this application.

When some pipe sections of a second fluid pipeline extend into an airbag but a first fluid pipeline does not extend into the airbag, a pipe section, of the second fluid pipeline, that extends into the airbag may also extend to a location with a specific spacing from an inner wall of the airbag. FIG. 18 is a schematic diagram of a structure of a fourth electronic device for measuring blood pressure according to an embodiment of this application. As shown in FIG. 18, an overall structure, a function, and an operating principle of the electronic device 400 for measuring blood pressure that is provided in this scenario are similar to those of the electronic device for measuring blood pressure in the foregoing scenario. Details are not described herein again. A difference from the scenario 3 lies in that, in the electronic device for measuring blood pressure in this scenario, a first nozzle 301 of a first fluid pipeline 3 is located at a location flush with an inner wall of an airbag 1. In a part, of a second fluid pipeline 4, that extends into the airbag 1, a location at which bending occurs is not attached to the inner wall of the airbag 1, but has a specific spacing from the inner wall of the airbag 1, so that there is a specific spacing between a second nozzle 401 and the inner wall of the airbag 1.

Figure 19:
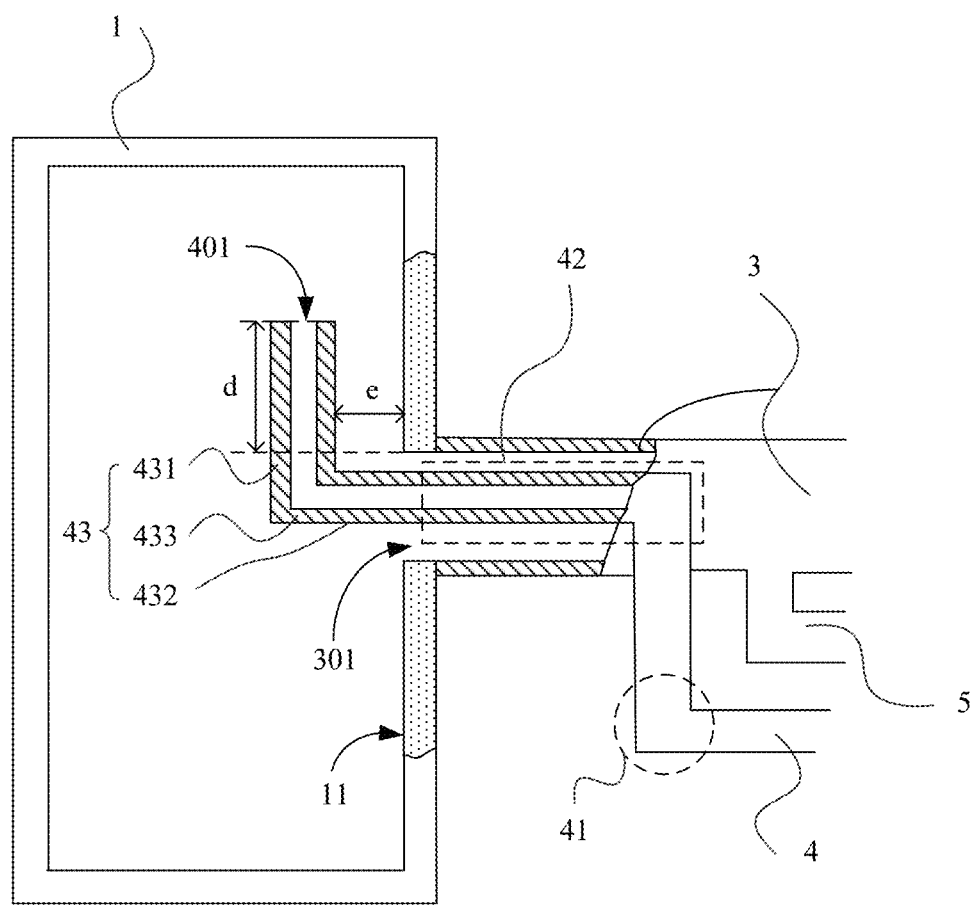
FIG. 19 is a schematic diagram of a specific structure of a junction region between a fluid pipeline and an airbag in the electronic device for measuring blood pressure in FIG. 18.

The first nozzle 301 does not extend into the airbag 1, but is at a location flush with the inner wall of the airbag 1. In this case, to increase a spacing between the first nozzle 301 and the second nozzle 401, there may be a specific spacing between the second nozzle 401 and an inner wall, of the airbag 1, that is connected to the fluid pipe, namely, a first inner wall 11. FIG. 19 is a schematic diagram of a specific structure of a junction region between the fluid pipeline and the airbag in the electronic device in FIG. 18. As shown in FIG. 19, specifically, in a fourth pipe section 43, of the second fluid pipeline 4, that extends into the airbag 1, after extending into the airbag 1, a fourth extension section 432 continues to extend to a location with a specific spacing from the first inner wall 11 of the airbag 1; and a third bent section 433 located at an end of the fourth extension section 432, and a third extension section 431 connected to the third bent section 433 also have corresponding spacings from the inner wall of the airbag 1. In this case, because the first nozzle 301 is disposed on the inner wall of the airbag 1, there may be a specific spacing between the first nozzle 301 and the second nozzle 401. Specifically, compared with the scenario 3, the spacing between the first nozzle 301 and the second nozzle 401 is determined by both a length d of the third extension section and a length e of the fourth extension section.

Optionally, the fourth extension section 432 may extend to a central region in the airbag 1, so that the third bent section 433 has a specific spacing from an inner wall in each direction in the airbag 1. In this case, the second nozzle 401 is also located in the central region in the airbag 1, and is far away from the first nozzle 301, so that an accurate pressure value can be collected.

For example, similar to the scenario 2, in this embodiment, the fourth extension section 432 and the first fluid pipeline 3 may be parallel or approximately parallel to each other, and a roughly right bending angle is formed between the third extension section 431 and the fourth extension section 432.

In addition, the third extension section 431 and the fourth extension section 432 may be alternatively oriented in other different directions. For example, the fourth extension section 432 may extend in a direction away from the first inner wall 11, to increase a spacing between the second nozzle 401 and the first inner wall 11. A person skilled in the art can understand that a bending angle between the third extension section 431 and the fourth extension section 432 may be greater than or equal to 90 degrees, so that there is a large spacing between the first nozzle 301 and the second nozzle 401.

To prevent deformation of the airbag 1 from affecting normal ventilation of the second nozzle 401, similar to the scenario 3, in an optional manner, the fourth pipe section 43, of the second fluid pipeline 4, that is located in the airbag 1 may be a rigid pipeline. In this way, even if the airbag 1 presses against the second fluid pipeline 4 due to reduction of inner space, the fourth pipe section 43 and the second nozzle 401 still retain original shapes and cross-sectional areas, thereby maintaining normal airflow in the second fluid pipeline 4. In addition, when the fourth pipe section 43 is a rigid pipeline, a spacing may also be always kept between the second nozzle 401 and the inner wall of the airbag 1, to avoid a location change of the second nozzle 401. Specifically, an extension section, of the second fluid pipeline 4, that is located in the airbag 1 may be made of framework rubber or another deformation-resistant material commonly used by a person skilled in the art. This is not limited herein.

Optionally, the entire second fluid pipeline 4 may be made of framework rubber or another material with similar characteristics. In this way, the second fluid pipeline 4 can be uniformly manufactured and molded, thereby reducing difficulty of assembly and manufacturing.

In addition, optionally, the entire first fluid pipeline 3 may also be made of framework rubber or another similar material, so that the first fluid pipeline 3 and the second fluid pipeline 4 are both manufactured by using a same process, a manufacturing process is simple, and costs are low.

In this embodiment, the electronic device for measuring blood pressure includes components such as a measurement assembly, the airbag, and the fluid pipelines, and orientations of the first nozzle and the second nozzle in the fluid pipelines are away from each other. Some pipe sections of the second fluid pipeline are nested in the first fluid pipeline, and some pipe sections of the second fluid pipeline extend into the airbag and are bent toward a side of the airbag. In a part, of the second fluid pipeline, that extends into the airbag, a location at which bending and a direction change occur has a specific spacing from the inner wall of the airbag, so that there is a specific spacing between the first nozzle and the inner wall of the airbag. In this way, the second nozzle is far away from the first nozzle, and is subject to small airflow impact, thereby helping improve measurement accuracy.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An electronic device for measuring blood pressure, comprising:
    a measurement assembly comprising a fluid pump and a pressure sensor;
    an airbag;
    a first fluid pipeline, wherein the fluid pump is connected to the airbag through the first fluid pipeline; and
    a second fluid pipeline, wherein the pressure sensor is connected to the airbag through the second fluid pipeline;
    wherein the first fluid pipeline has a first nozzle connected to the airbag, the second fluid pipeline has a second nozzle connected to the airbag, the first nozzle and the second nozzle are located on a same side of the airbag, and an opening direction of the first nozzle is away from an opening direction of the second nozzle.

2. The electronic device according to claim 1, wherein one of the first fluid pipeline or the second fluid pipeline forms an outer pipe section and the other forms an inner pipe section, wherein the outer pipe section is sleeved outside of the inner pipe section, and there is a gap between an outer wall of the inner pipe section and an inner wall of the outer pipe section.

3. The electronic device according to claim 1, wherein at least one of the first fluid pipeline or the second fluid pipeline has a built-in pipe section that extends into the airbag, so that at least one of the first nozzle or the second nozzle is located in the airbag.

4. The electronic device according to claim 3, wherein one of the first nozzle or the second nozzle extends into the airbag and is suspended, and the other is flush with an inner wall of the airbag.

5. The electronic device according to claim 3, wherein the built-in pipe section comprises a bent section, and there is an angle between a pipe section of the built-in pipe section that is located before the bent section and a pipe section of the built-in pipe section that is located after the bent section.

6. The electronic device according to claim 5, wherein the pipe section of the built-in pipe section that is located before the bent section is perpendicular to the pipe section of the built-in pipe section that is located after the bent section.

7. The electronic device according to claim 3, wherein the built-in pipe section is located in the first fluid pipeline, and the second fluid pipeline extends to a location flush with an inner wall of the airbag.

8. The electronic device according to claim 7, wherein the built-in pipe section is a flexible pipe section, and the built-in pipe section is attached to the inner wall of the airbag.

9. The electronic device according to claim 7, wherein the built-in pipe section is a rigid pipe section, the built-in pipe section is suspended in the airbag, and there is a spacing between the first nozzle and the inner wall of the airbag.

10. The electronic device according to claim 9, wherein pipe sections of the first fluid pipeline have an integrated structure.

11. The electronic device according to claim 3, wherein the built-in pipe section is located in the second fluid pipeline, and the first fluid pipeline extends to a location flush with an inner wall of the airbag.

12. The electronic device according to claim 11, wherein:
the built-in pipe section is suspended in the airbag, and there is a spacing between the second nozzle and the inner wall of the airbag; or
the built-in pipe section is attached to the inner wall of the airbag.

13. The electronic device according to claim 12, wherein the electronic device is configured to be put on a human body, and when put on the human body, a location of the second nozzle in the airbag corresponds to a location of an artery of the human body.

14. The electronic device according to claim 11, wherein the built-in pipe section is a rigid pipe section.

15. The electronic device according to claim 14, wherein pipe sections of the second fluid pipeline have an integrated structure.

16. The electronic device according to claim 1, further comprising:

a fluid valve; and
a third fluid pipeline, wherein a first end of the third fluid pipeline is connected to the fluid valve, and a second end of the third fluid pipeline is connected to the airbag.

17. The electronic device according to claim 16, wherein the second end of the third fluid pipeline is connected to the first fluid pipeline.

18. The electronic device according to claim 16, wherein at least some pipe sections of the first fluid pipeline are flexible pipe sections capable of collapsing, and the second end of the third fluid pipeline is connected to the second fluid pipeline.

19. The electronic device according to claim 1, further comprising:
a body; and
a wrist strap connected to the body;
wherein the measurement assembly is disposed inside a housing of the body, and the airbag is disposed on the wrist strap.

* * * * *